1997B2

United States Patent
Tamaki et al.

(10) Patent No.: US 9,151,997 B2
(45) Date of Patent: Oct. 6, 2015

(54) SEMI-TRANSMISSIVE LIQUID CRYSTAL DISPLAY DEVICE AND ELECTRONIC APPARATUS

(71) Applicant: Japan Display Inc., Tokyo (JP)

(72) Inventors: Masaya Tamaki, Tokyo (JP); Kazuyuki Maeda, Tokyo (JP)

(73) Assignee: Japan Display Inc., Tokyo (JP)

( * ) Notice: Subject to any disclaimer, the term of this patent is extended or adjusted under 35 U.S.C. 154(b) by 125 days.

(21) Appl. No.: 13/943,203

(22) Filed: Jul. 16, 2013

(65) Prior Publication Data

US 2014/0022499 A1    Jan. 23, 2014

(30) Foreign Application Priority Data

Jul. 18, 2012    (JP) ................................. 2012-159877

(51) Int. Cl.
| | |
|---|---|
| *G02F 1/1335* | (2006.01) |
| *G02F 1/1343* | (2006.01) |
| *G02F 1/13363* | (2006.01) |

(52) U.S. Cl.
CPC ...... *G02F 1/13439* (2013.01); *G02F 1/133555* (2013.01); *G02F 2001/133638* (2013.01); *G02F 2001/134345* (2013.01); *G02F 2413/04* (2013.01); *G02F 2413/06* (2013.01); *G09G 2300/0456* (2013.01)

(58) Field of Classification Search
CPC ................ G02F 2203/09; G02F 2001/134345; G02F 1/133553; G02F 1/133555; G09G 2300/0456
See application file for complete search history.

(56) References Cited

U.S. PATENT DOCUMENTS

| | | | | |
|---|---|---|---|---|
| 5,040,875 | A | * | 8/1991 | Noguchi ........................ 349/143 |
| 5,124,695 | A | * | 6/1992 | Green ............................ 345/103 |

(Continued)

FOREIGN PATENT DOCUMENTS

| | | |
|---|---|---|
| JP | 08-286178 | 11/1996 |
| JP | 11-326874 | 11/1999 |

(Continued)

OTHER PUBLICATIONS

Notice of Preliminary Rejection issued in connection with Korean Patent Application No. 10-2013-84165, dated Jun. 16, 2014. (10 pages).
Japanese Office Action issued Aug. 11, 2015 in corresponding Japanese Application No. 2012-159877.

*Primary Examiner* — Richard Kim
*Assistant Examiner* — Ryan Crockett
(74) *Attorney, Agent, or Firm* — K&L Gates LLP

(57) ABSTRACT

According to an aspect, a semi-transmissive liquid crystal display device includes a plurality of pixels arranged in a matrix, a plurality of reflective electrodes, a counter electrode facing the reflective electrode, and a liquid crystal layer. The reflective electrodes are provided for each of the pixels, and each of them includes a plurality of electrodes, with a combination of the areas of which area coverage modulation is performed by using n bits. The electrodes are configured such that a ratio of the sum of the perimeter(s) of electrode(s) corresponding to each bit of the n bits satisfies $1:2:\ldots:2^{n-1}$. The liquid crystal layer is provided between the reflective electrode and the counter electrode. The semi-transmissive liquid crystal display device is configured to carry out reflective display using the reflective electrode and carry out transmissive display using at least a space of the reflective electrode between the pixels.

15 Claims, 34 Drawing Sheets

(56) References Cited

U.S. PATENT DOCUMENTS

| | | | |
|---|---|---|---|
| 5,539,546 A * | 7/1996 | Koden et al. | 349/86 |
| 7,400,377 B2 * | 7/2008 | Evans et al. | 349/194 |
| 7,758,932 B2 * | 7/2010 | Harada et al. | 349/123 |
| 2002/0047822 A1 * | 4/2002 | Senda et al. | 345/90 |
| 2009/0066893 A1 * | 3/2009 | Tsai et al. | 349/113 |
| 2010/0194709 A1 * | 8/2010 | Tamaki et al. | 345/174 |
| 2011/0063551 A1 * | 3/2011 | Go et al. | 349/114 |
| 2012/0162594 A1 * | 6/2012 | Tamaki et al. | 349/139 |
| 2012/0313906 A1 * | 12/2012 | Tamaki et al. | 349/113 |
| 2012/0320025 A1 * | 12/2012 | Tamaki | 345/212 |

FOREIGN PATENT DOCUMENTS

| | | |
|---|---|---|
| JP | 2002-311446 | 10/2002 |
| JP | 2004-177875 | 6/2004 |
| JP | 2005-300579 * | 10/2005 |
| JP | 2005-316203 | 11/2005 |
| JP | 2006-251417 | 9/2006 |
| JP | 2009-093115 | 4/2009 |
| JP | 2011-186002 | 9/2011 |
| JP | 2012-133014 | 7/2012 |
| KR | 10-2011-0030053 | 3/2011 |
| WO | 2006/038598 | 4/2006 |

* cited by examiner

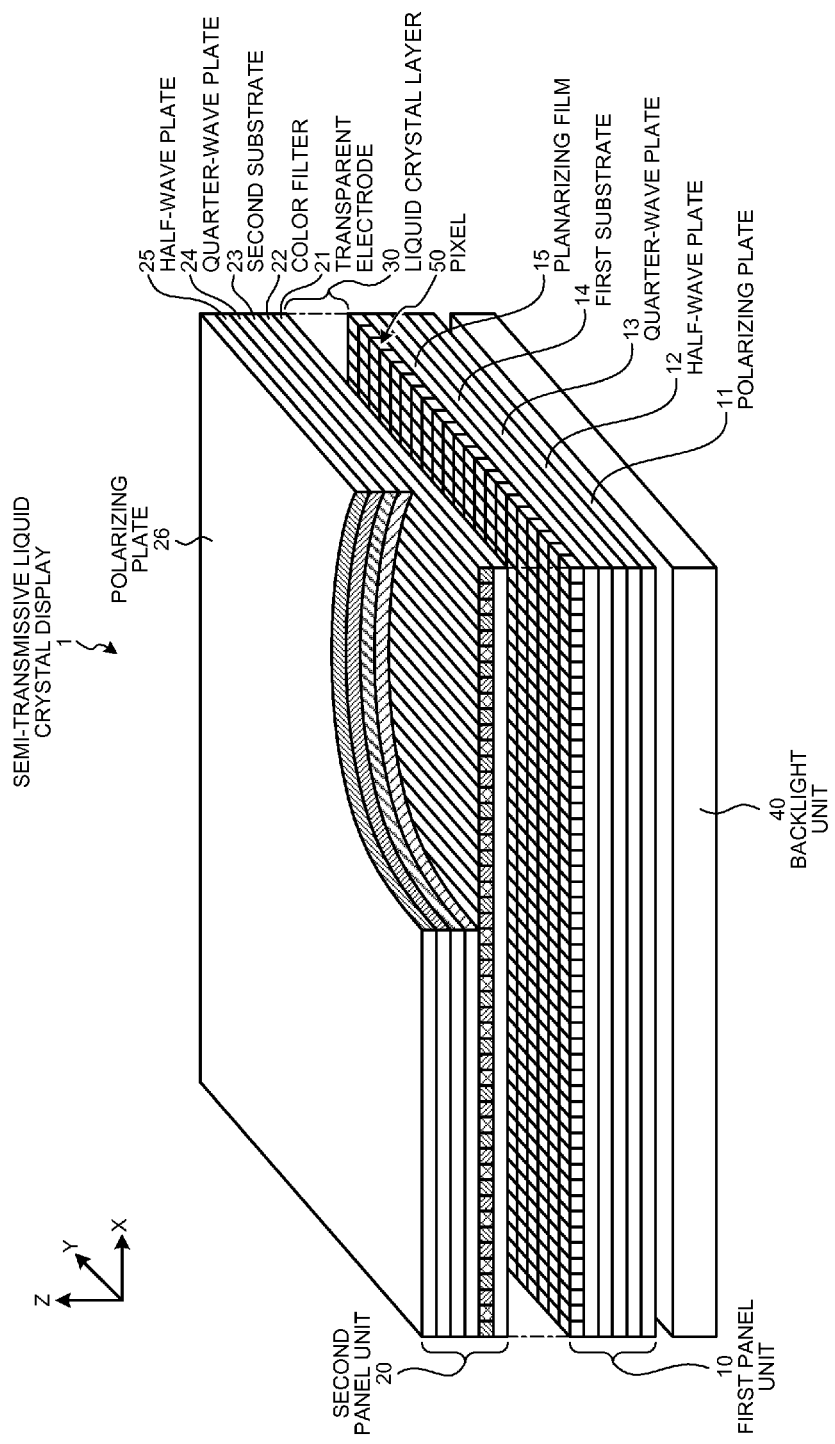

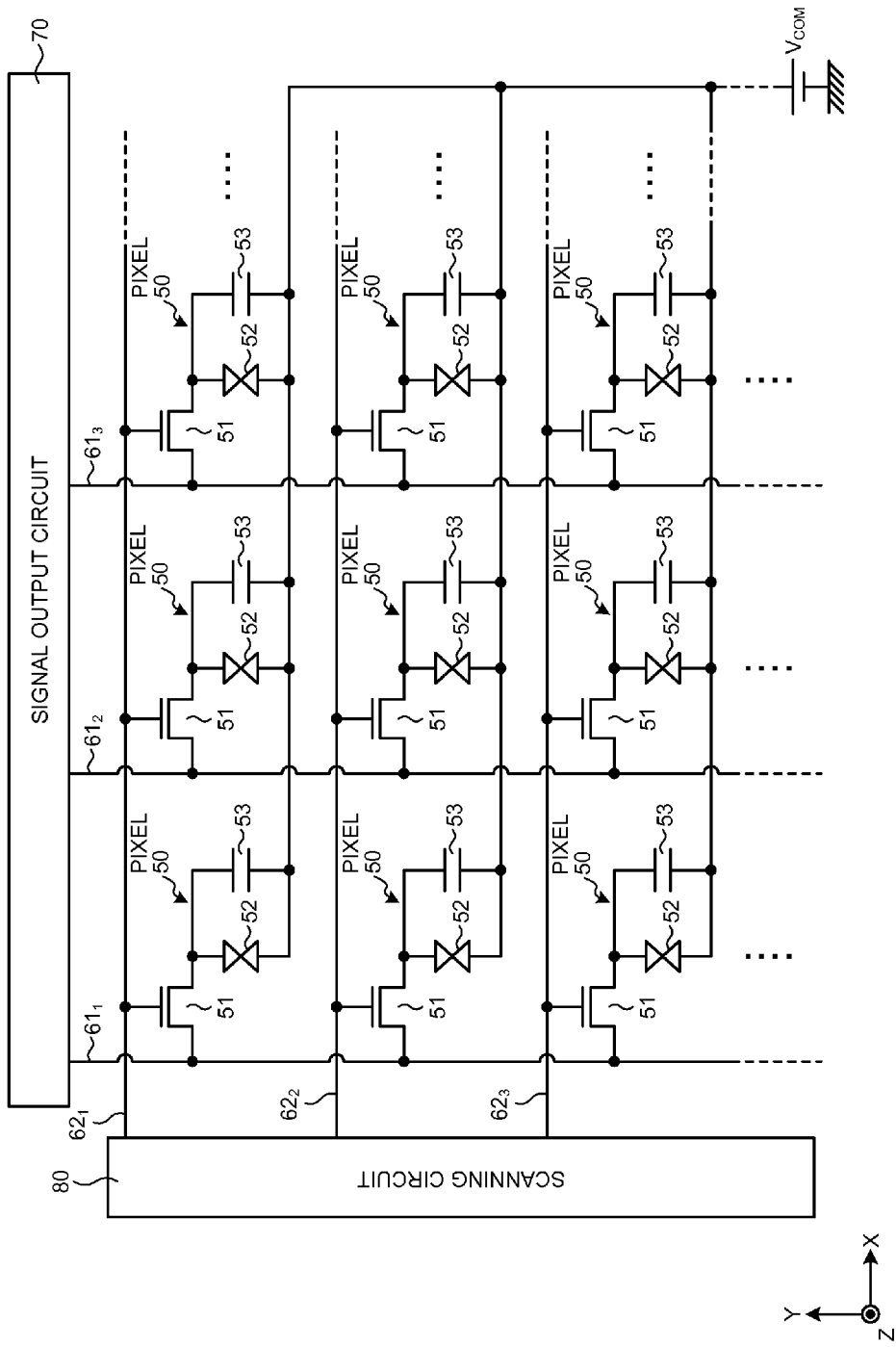

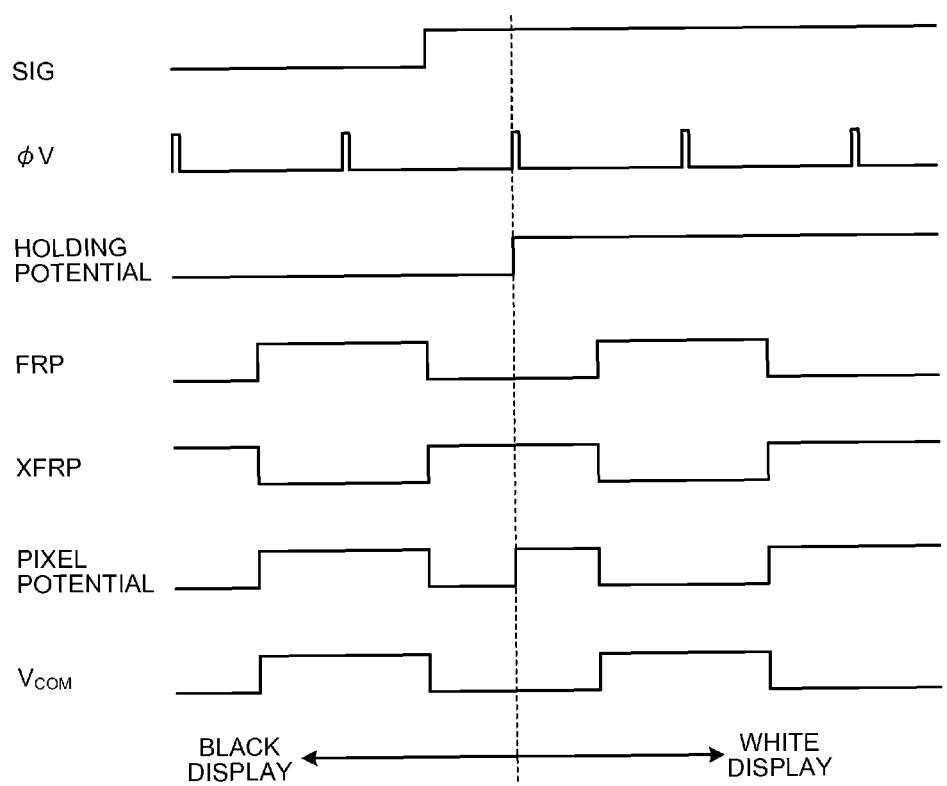

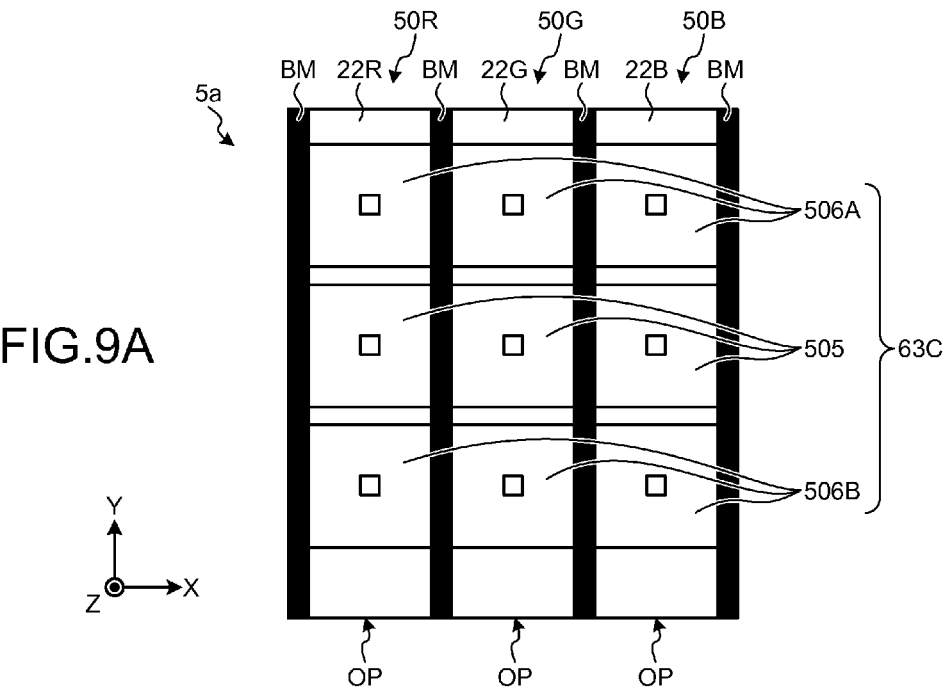
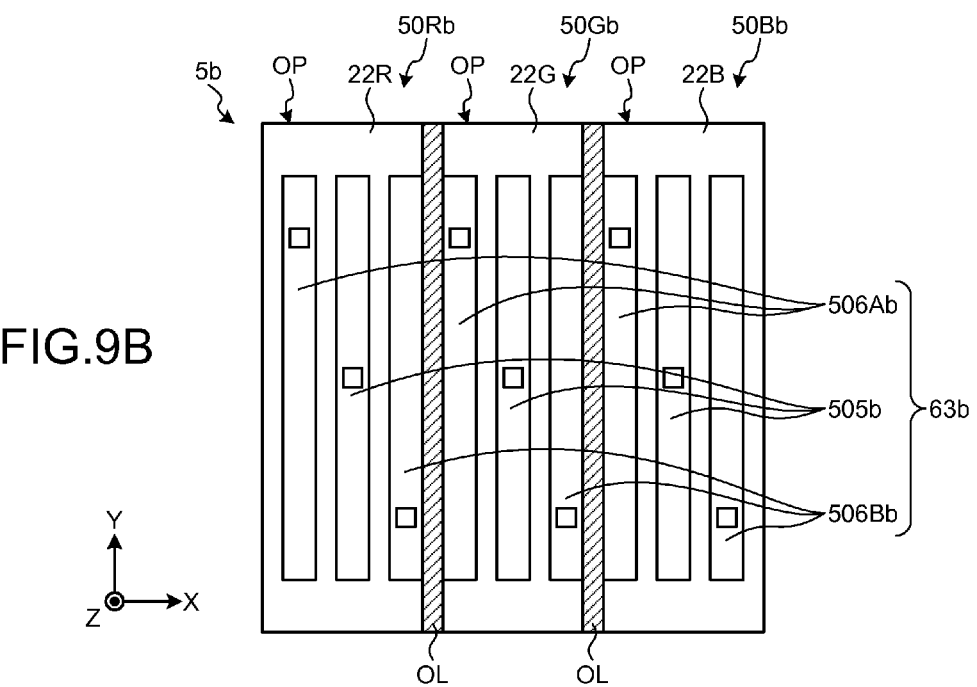

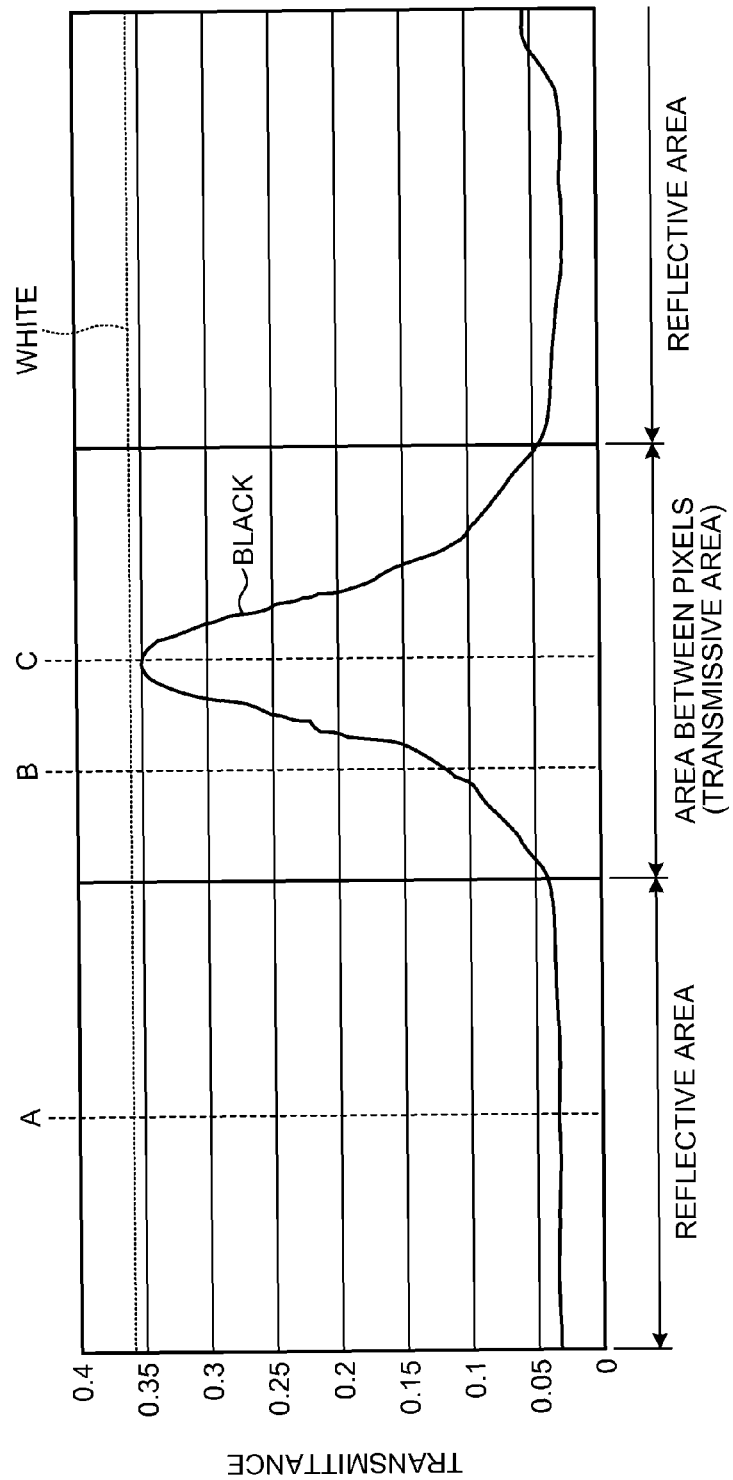

27B  27S

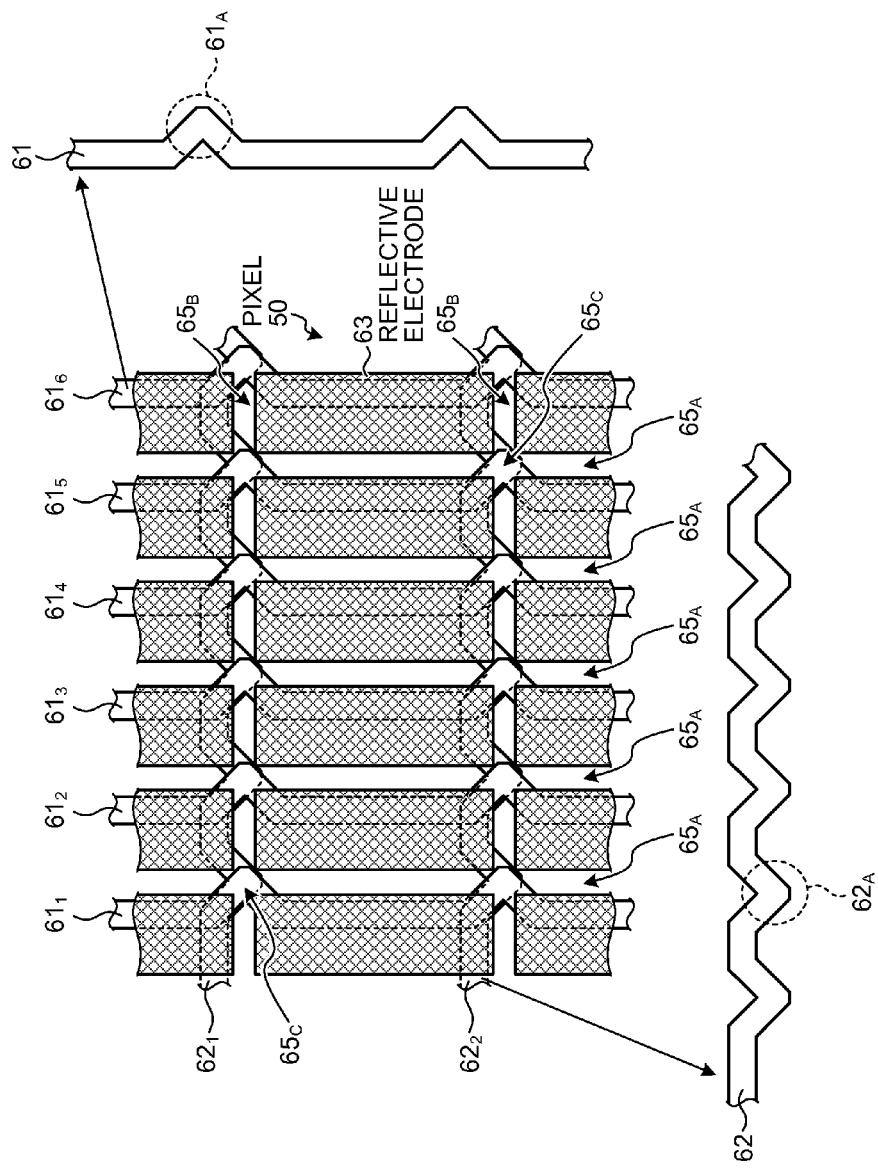

141 UPPER HOUSING
144 DISPLAY
142 LOWER HOUSING

141 UPPER HOUSING
142 LOWER HOUSING

SEMI-TRANSMISSIVE LIQUID CRYSTAL DISPLAY DEVICE AND ELECTRONIC APPARATUS

CROSS REFERENCES TO RELATED APPLICATIONS

The present application claims priority to Japanese Priority Patent Application JP 2012-159877 filed in the Japan Patent Office on Jul. 18, 2012, the entire content of which is hereby incorporated by reference.

BACKGROUND

1. Technical Field

The present disclosure relates to a semi-transmissive liquid crystal display device and an electronic apparatus.

2. Description of the Related Art

Types of display devices include transmissive display devices and reflective display devices. Transmissive display devices carry out display using transmitted light of backlight output from the back surface of a screen. Reflective display devices carry out display using reflected light of outer light. Transmissive display devices provide high saturation and provide a screen easy to see in dark environment. Reflective display devices require less power consumption and provide a screen easy to see in bright environment.

Furthermore, types of display devices include semi-transmissive liquid crystal display devices that have the characteristics of transmissive display devices and reflective display devices. Japanese Patent Application Laid-open Publication No. 2009-93115, for example, discloses a semi-transmissive liquid crystal display device including a transmissive display area (a transmissive display portion) and a reflective display area (a reflective display portion) in a pixel. Semi-transmissive liquid crystal display devices carry out display using transmitted light of backlight in dark environment and carry out display using reflected light of outer light in bright environment.

Semi-transmissive liquid crystal display devices provide a screen easy to see both in the bright environment and the dark environment and require less power consumption. For these reasons, semi-transmissive liquid crystal display devices are used as a display unit of electronic apparatuses, specifically, of mobile electronic apparatuses (mobile devices) frequently used outdoors including mobile information devices, such as digital cameras, and mobile communication devices, such as mobile phones.

Such semi-transmissive liquid crystal display devices have a trade-off between securement of a transmissive display area and maintenance of reflective display performance. In other words, significant securement of the transmissive display area for improvement in transmissive display performance requires reduction in the reflective display area corresponding thereto, thereby reducing the reflective display performance. By contrast, maintenance of reflective display performance equivalent to that of a reflective display device requires significant securement of the reflective display area, thereby reducing the transmissive display performance corresponding thereto.

For the foregoing reasons, there is a need for a semi-transmissive liquid crystal display device that can carry out transmissive display while maintaining reflective display performance equivalent to that of a reflective display device and an electronic apparatus including the semi-transmissive liquid crystal display device.

SUMMARY

According to an aspect, a semi-transmissive liquid crystal display device includes a plurality of pixels arranged in a matrix, a plurality of reflective electrodes, a counter electrode facing the reflective electrode, and a liquid crystal layer. The reflective electrodes are provided for each of the pixels, and each of them includes a plurality of electrodes, with a combination of the areas of which area coverage modulation is performed by using n bits, where n is an integer equal to or more than 2. The electrodes are configured such that a ratio of the sum of the perimeter(s) of electrode(s) corresponding to each bit of the n bits satisfies $1:2:\ldots:2^{n-1}$. The liquid crystal layer is provided between the reflective electrode and the counter electrode. The semi-transmissive liquid crystal display device is configured to carry out reflective display using the reflective electrode and carry out transmissive display using at least a space of the reflective electrodes between the pixels.

According to another aspect, a semi-transmissive liquid crystal display device includes a plurality of pixels arranged in a matrix, a plurality of reflective electrodes, a counter electrode facing the reflective electrode, and a liquid crystal layer. The reflective electrodes are provided for each of the pixels, and each of them includes a plurality of electrodes, with a combination of the areas of which area coverage modulation is performed by using n bits, where n is an integer equal to or more than 2. The electrodes are configured such that a ratio of the sum of the perimeter(s) of electrode(s) corresponding to each bit of the n bits satisfies $1:2:\ldots:2^{n-1}$ in an opening of the pixel. The liquid crystal layer is provided between the reflective electrode and the counter electrode. The semi-transmissive liquid crystal display device is configured to carry out reflective display using the reflective electrode and carry out transmissive display using at least a space of the reflective electrodes between the pixels.

According to another aspect, an electronic apparatus includes a semi-transmissive liquid crystal display device. The semi-transmissive liquid crystal display device includes a plurality of pixels arranged in a matrix, a plurality of reflective electrodes, a counter electrode facing the reflective electrode, and a liquid crystal layer. The reflective electrodes are provided for each of the pixels, and each of them includes a plurality of electrodes, with a combination of the areas of which area coverage modulation is performed by using n bits, where n is an integer equal to or more than 2. The electrodes are configured such that a ratio of the sum of the perimeter(s) of electrode(s) corresponding to each bit of the n bits satisfies $1:2:\ldots:2^{n-1}$. The liquid crystal layer is provided between the reflective electrode and the counter electrode. The semi-transmissive liquid crystal display device is configured to carry out reflective display using the reflective electrode and carry out transmissive display using at least a space of the reflective electrodes between the pixels.

Additional features and advantages are described herein, and will be apparent from the following Detailed Description and the figures.

BRIEF DESCRIPTION OF THE FIGURES

FIG. 1 is a perspective view schematically illustrating a configuration of a semi-transmissive liquid crystal display device, to which the present disclosure can be applied, with a part thereof cut out;

FIG. 2A is a circuit diagram of a basic pixel circuit;

FIG. 7 is a timing chart for explaining an operation of the pixel that employs the MIP system;

FIG. 9A is a view of pixels for constituting a color image, viewed from the color-filter side;

FIG. 9B is another view of pixels for constituting a color image, viewed from the color-filter side;

FIG. 14 is a diagram illustrating a simulation result of transmittance between pixels in a normally white mode;

FIG. 25 is a plan view of an electrode structure of a pixel unit according to a modification;

DETAILED DESCRIPTION

Figure 2B:
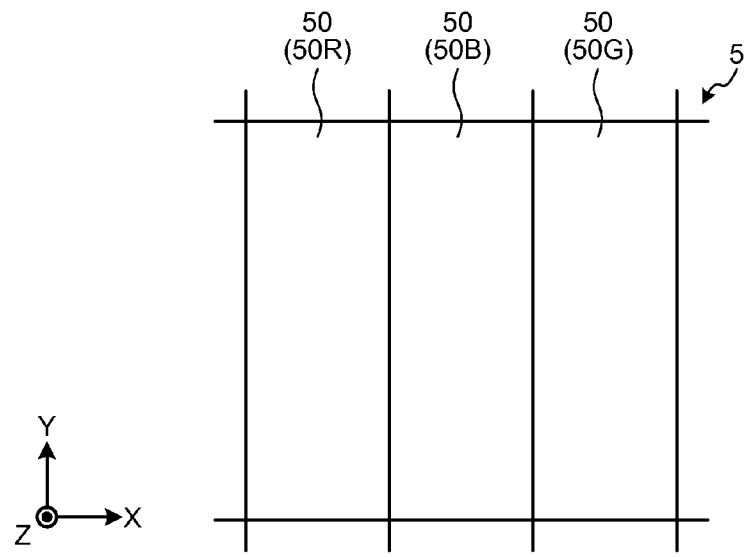
FIG. 2B is a schematic diagram of a pixel in color display device.

Examples for embodying technologies according to the present disclosure (hereinafter, referred to as "embodiments") are described below in greater detail with reference to the accompanying drawings in the following order:

1. Semi-transmissive liquid crystal display device to which the present disclosure can be applied
   1-1. Semi-transmissive liquid crystal display device supporting color display
   1-2. Basic pixel circuit
   1-3. Pixel and sub-pixel
   1-4. Study of electrode structure of pixel unit
2. Description of embodiments
   2-1. Method for driving liquid crystal display panel
   2-2. MIP system
   2-3. Area coverage modulation method
   2-4. Display mode
   2-5. Specific example
3. Modifications
4. Electronic apparatuses

1. Semi-Transmissive Liquid Crystal Display Device to which the Present Disclosure can be Applied The technologies according to the present disclosure are applicable to a flat-panel (flat) display device. Examples of the flat-panel display device may include display devices provided with a liquid crystal display (LCD) panel, display devices provided with an electroluminescence (EL) display panel, and display devices provided with a plasma display (PD) panel.

These flat-panel display devices can be classified by their display types into transmissive display devices, reflective display devices, and semi-transmissive display devices. The technologies according to the present disclosure are applicable to semi-transmissive liquid crystal display device that have the characteristics of transmissive display devices and reflective display devices. In other words, the semi-transmissive liquid crystal display devices provide a screen easy to see both under the bright environment and the dark environment and requires less power consumption. The semi-transmissive liquid crystal display device having these characteristics is preferably used as a display unit of electronic apparatuses, specifically, of mobile electronic apparatuses frequently used outdoors, that is, mobile devices including mobile information devices, such as digital cameras, and mobile communication devices, such as mobile phones.

The semi-transmissive liquid crystal display device, to the present disclosure can be applied, may be a display device supporting monochrome display or a display device supporting color display. If the semi-transmissive liquid crystal display device supports color display, one pixel (a unit pixel) serving as a unit that constitutes a color image includes a plurality of sub-pixels. More specifically, in the display device supporting color display, the unit pixel includes three sub-pixels of a sub-pixel that displays red (R), a sub-pixel that displays green (G), and a sub-pixel that displays blue (B), for example.

The pixel is not necessarily obtained by combining sub-pixels in the three-primary colors of RGB. The unit pixel may be obtained by adding sub-pixels in one color or a plurality of colors to the sub-pixels in the three primary colors of RGB. More specifically, for example, the unit pixel may be obtained by adding a sub-pixel that displays white (W) to increase the luminance or adding at least one sub-pixel that displays a complementary color to expand a color reproduction range.

1-1. Semi-Transmissive Liquid Crystal Display Device Supporting Color Display

An explanation will be made of a semi-transmissive liquid crystal display device supporting color display as an example of the semi-transmissive liquid crystal display device to which the present disclosure can be applied.

FIG. 1 is a perspective view schematically illustrating a configuration of the semi-transmissive liquid crystal display device supporting color display, to which the present disclosure can be applied, with a part thereof cut out.

As illustrated in FIG. 1, a semi-transmissive liquid crystal display device 1, to which the present disclosure can be applied, includes a first panel unit 10, a second panel unit 20, a liquid crystal layer 30, and a backlight unit 40 as main components. The surface of the second panel unit 20 serves as a display surface in the semi-transmissive liquid crystal display device 1. The first panel unit 10 and the second panel unit 20 are arranged in a manner facing each other with a predetermined gap interposed therebetween. Sealing the gap between the first panel unit 10 and the second panel unit 20 with a liquid crystal material forms the liquid crystal layer 30.

The first panel unit 10 includes a polarizing plate 11, a half-wave plate 12, a quarter-wave plate 13, a first substrate 14 made of a substrate material including transparent glass, and a planarizing film 15 arranged in this order from the side opposite to the liquid crystal layer 30, that is, from the backlight unit 40 side.

The first panel unit 10 is provided with a plurality of signal lines and a plurality of scanning lines, neither of which is illustrated, formed on the first substrate 14 in a manner intersecting with each other. Sub-pixels (hereinafter, which may be simply referred to as "pixels") 50 are two-dimensionally arranged in a matrix at portions where the signal lines and the scanning lines intersect with each other.

Circuit elements including switching elements and capacitative elements, such as a thin film transistor (TFT), are formed on the first substrate 14 for the respective pixels 50. Formation of the planarizing film 15 on the surface of the circuit elements, the signal lines, and the scanning lines planarizes the surface of the first panel unit 10. Reflective electrodes, which will be described later, are formed on the planarizing film 15 for the respective pixels 50. Because the circuit elements including the TFT are formed on the first substrate 14, the first substrate 14 may be referred to as a TFT substrate.

The signal lines are wiring that transmits a signal (a display signal or a video signal) for driving the pixels 50. The signal lines have a wiring structure extending along an arrangement direction of pixels of pixel columns, that is, along a column direction (a Y-direction in FIG. 1) for the respective pixel columns with respect to the matrix arrangement of the pixels 50. The scanning lines are wiring that transmits a signal (a scanning signal) for selecting the pixels 50 in units of row. The scanning lines have a wiring structure extending along an arrangement direction of pixels of pixel rows, that is, along a row direction (an X-direction in FIG. 1) for the respective pixel rows with respect to the matrix arrangement of the pixels 50. The X-direction and the Y-direction intersect with each other.

The second panel unit 20 includes a transparent electrode 21 formed of an indium tin oxide (ITO) and the like, a color filter 22, a second substrate 23 made of a substrate material including transparent glass, a quarter-wave plate 24, a half-wave plate 25, and a polarizing plate 26 arranged in this order from the liquid crystal layer 30 side.

In the second panel unit 20, the color filter 22 has a structure in which filters in stripes of red (R), green (G), and blue (B) extending in the column direction (Y-direction) are repeatedly arranged at the same pitch as that of the pixels 50 in the row direction (X-direction), for example. Because the second substrate 23 includes the color filter (CF) 22, the second substrate 23 may be referred to as a CF substrate.

A semi-transmissive LCD panel is formed of the first panel unit 10, the second panel unit 20 arranged in a manner facing the first panel unit 10, and the liquid crystal layer 30 arranged between the first panel unit 10 and the second panel unit 20. The top surface (surface) of the second panel unit 20 serves as the display surface.

The backlight unit 40 is an illuminating unit that illuminates the LCD panel from the back side of the LCD panel, that is, from the side opposite to the liquid crystal layer 30 of the first panel unit 10. The configuration and the components of the backlight unit 40 are not particularly restricted. The backlight unit 40 may be formed of well-known members including a light source, such as a light-emitting diode (LED) and a fluorescent tube, a prism sheet, a diffusion sheet, and a light guide plate, for example.

In the semi-transmissive liquid crystal display device 1 having the configuration described above, the pixels 50 each include a reflective display area (a reflective display portion) and a transmissive display area (a transmissive display portion). As described above, the reflective display area includes the reflective electrode formed for each of the pixels 50 on the surface of the planarizing film 15. The reflective display area reflects, with the reflective electrode, outer light entering from the outside through the second panel unit 20 to carry out display with the reflected light. The transmissive display area transmits light output from the backlight unit 40 to carry out display with the transmitted light. The transmissive display area provided to each of the pixels 50 will be described later in detail.

1-2. Basic Pixel Circuit

A basic pixel circuit of the pixel 50 will now be described with reference to FIG. 2A. In FIG. 2A, a direction indicated by X (X-direction) represents the row direction of the semi-transmissive liquid crystal display device 1 illustrated in FIG. 1, and a direction indicated by Y (Y-direction) represents the column direction thereof.

As illustrated in FIG. 2A, a plurality of signal lines 61 ($61_1$, $61_2$, $61_3$, . . . ) and a plurality of scanning lines 62 ($62_1$, $62_2$, $62_3$, . . . ) are arranged in a manner intersecting with each other. The pixels 50 are arranged at the intersections. The scanning lines 62 ($62_1$, $62_2$, $62_3$, . . . ) extend in the row direction (X-direction), whereas the signal lines 61 ($61_1$, $61_2$, $61_3$, . . . ) extend in the column direction (Y-direction). As described above, the signal lines 61 and the scanning lines 62 are formed on the surface of the first substrate (TFT substrate) 14 of the first panel unit 10. One end of each signal lines 61 ($61_1$, $61_2$, $61_3$, . . . ) is connected to, among output terminals of a signal output circuit 70, a terminal corresponding to the column. One end of each scanning lines 62 ($62_1$, $62_2$, $62_3$, . . . ) is connected to, among output terminals of a scanning circuit 80, a terminal corresponding to the row.

The pixel 50 includes a pixel transistor 51 formed of a TFT, a liquid crystal capacitance 52, and a capacitance 53, for example. The pixel transistor 51 includes a gate electrode connected to the scanning line 62 ($62_1$, $62_2$, $62_3$, . . . ), and a source electrode connected to the signal line 61 ($61_1$, $61_2$, $61_3$, . . . ).

The liquid crystal capacitance 52 is a capacitance component of the liquid crystal material generated between a pixel electrode and a counter electrode (corresponding to the transparent electrode 21 in FIG. 1) formed in a manner facing the pixel electrode. The pixel electrode is connected to a drain electrode of the pixel transistor 51. The pixel electrode corresponds to a reflective electrode formed for each sub-pixel in color display and to a reflective electrode formed for each pixel in monochrome display. A common electric potential $V_{COM}$ of a direct-current (DC) voltage is commonly applied to the counter electrodes of the liquid crystal capacitances 52 in all the pixels. The capacitance 53 includes one electrode connected to the pixel electrode of the liquid crystal capacitance 52, and the other electrode connected to the counter electrode of the liquid crystal capacitance 52.

As is clear from the pixel circuit described above, the signal lines 61 ($61_1$, $61_2$, $61_3$, . . . ) are wiring that transmits a signal for driving the pixels 50, that is, a video signal output from the signal output circuit 70 to the pixels 50 in each pixel column. The scanning lines 62 ($62_1$, $62_2$, $62_3$, . . . ) are wiring that transmits a signal for selecting the pixels 50 in units of row, that is, a scanning signal output from the scanning circuit 80 to each pixel row.

1-3. Pixel and Sub-Pixel

Figure 2C:
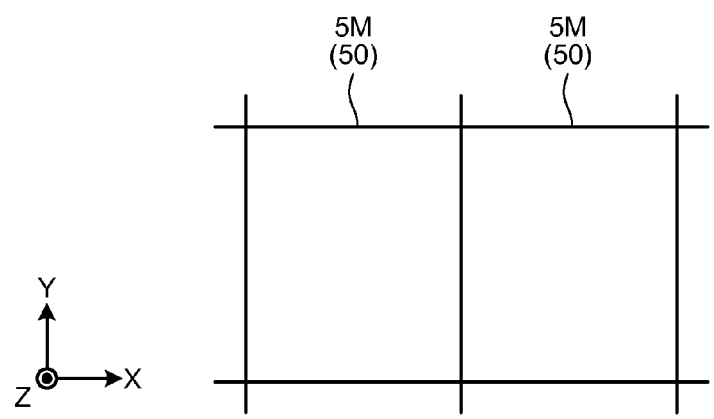
FIG. 2C a schematic diagram of pixels in monochrome display device.

If the semi-transmissive liquid crystal display device 1 supports color display, one pixel serving as a unit that constitutes a color image, that is, a unit pixel 5 includes a plurality of sub-pixels 50, for example, as illustrated in FIG. 2B. In this example, the unit pixel 5 includes a sub-pixel 50R that displays R, a sub-pixel 50B that displays B, and a sub-pixel 50G that displays G. The sub-pixels 50R, 50B, and 50G included in the unit pixel 5 are arranged in the X-direction, that is, in the row direction of the semi-transmissive liquid crystal display device 1. The unit pixel 5 may further include sub-pixels in one color or a plurality of colors as described above. If the semi-transmissive liquid crystal display device 1 supports monochrome display alone, one pixel serving as a unit that constitutes a monochrome image, that is, a unit pixel 5M is the pixel 50 (corresponding to the sub-pixel 50 in color display) as illustrated in FIG. 2C. The unit pixel 5 is a basic unit that displays a color image, whereas the unit pixel 5M is a basic unit that displays a monochrome image.

1-4. Study of Electrode Structure of Pixel Unit

Before the explanation of the transmissive display area, the electrode structure of the pixel 50 will be studied.

Figure 3A:
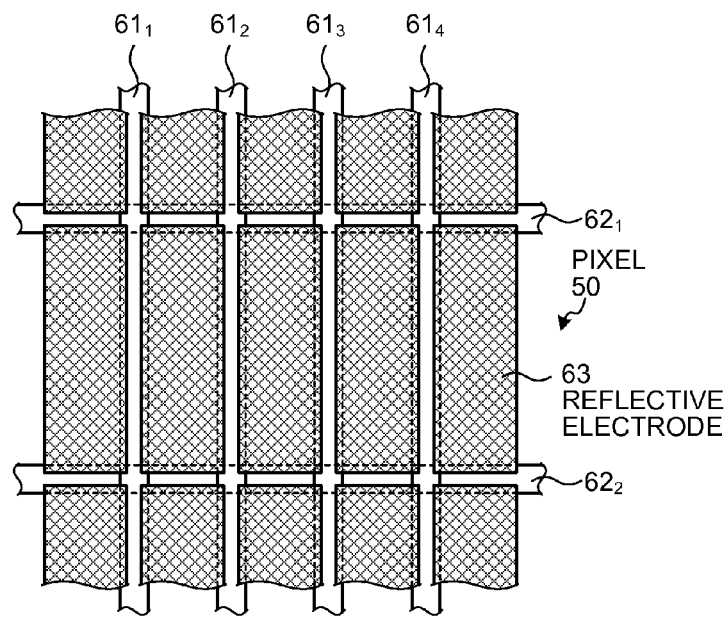
FIG. 3A is a plan view of a pixel unit of a reflective liquid crystal display device.
Figure 3B:
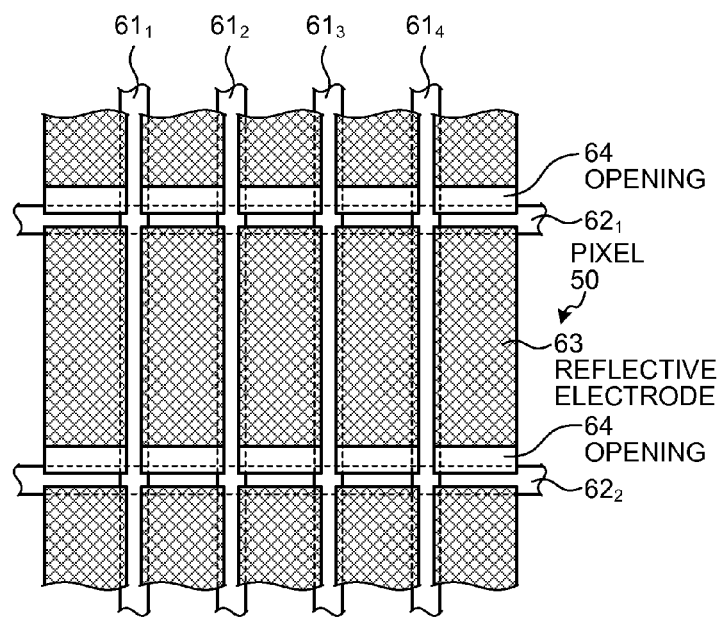
FIG. 3B is a plan view of a pixel unit of a semi-transmissive liquid crystal display device.

FIGS. 3A and 3B are views for explaining an electrode structure of a pixel unit of the related art. FIG. 3A is a plan view of a pixel unit of a reflective (total reflective) liquid crystal display device. FIG. 3B is a plan view of a pixel unit of a semi-transmissive liquid crystal display device. In FIG. 3A and FIG. 3B, a reflective electrode 63 is indicated by shading.

As illustrated in FIG. 3A and FIG. 3B, a pixel unit of a liquid crystal display device typically has the following structure: the pixels 50 are arranged in a matrix; the signal lines 61 are arranged at spatial positions between the pixels 50 extending along the column direction with respect to the matrix array; and the scanning lines 62 are arranged at spatial positions between the pixels 50 extending along the row direction. As described above, the signal lines 61 and the scanning lines 62 are arranged in a manner intersecting with each other on the first substrate 14 of the first panel unit 10 in FIG. 1.

In the pixel unit (pixel array unit) having such a structure, the reflective liquid crystal display device illustrated in FIG. 3A has the reflective electrode 63 made of a metal, such as aluminum, in a size nearly the same as that of the pixel 50. The reflective liquid crystal display device uses the area of the reflective electrode 63 as the reflective display area. In other words, the reflective liquid crystal display device secures the reflective display area in a size nearly the same as that of the pixel 50, thereby providing desired reflective display performance.

By contrast, the semi-transmissive liquid crystal display device illustrated in FIG. 3B has the reflective electrode 63 and an opening 64 in one pixel 50 and uses the opening 64 as the transmissive display area. Forming the opening 64 in the pixel 50 for securement of the transmissive display area cannot avoid reduction in the reflective electrode 63, that is, in the reflective display area corresponding to the area of the opening 64. As a result, the semi-transmissive liquid crystal display device may provide reflective display performance lower than that of the reflective liquid crystal display device. In other words, securement of the transmissive display area and maintenance of the reflective display performance are in a trade-off relation.

2. Description of Embodiments

Figure 4:
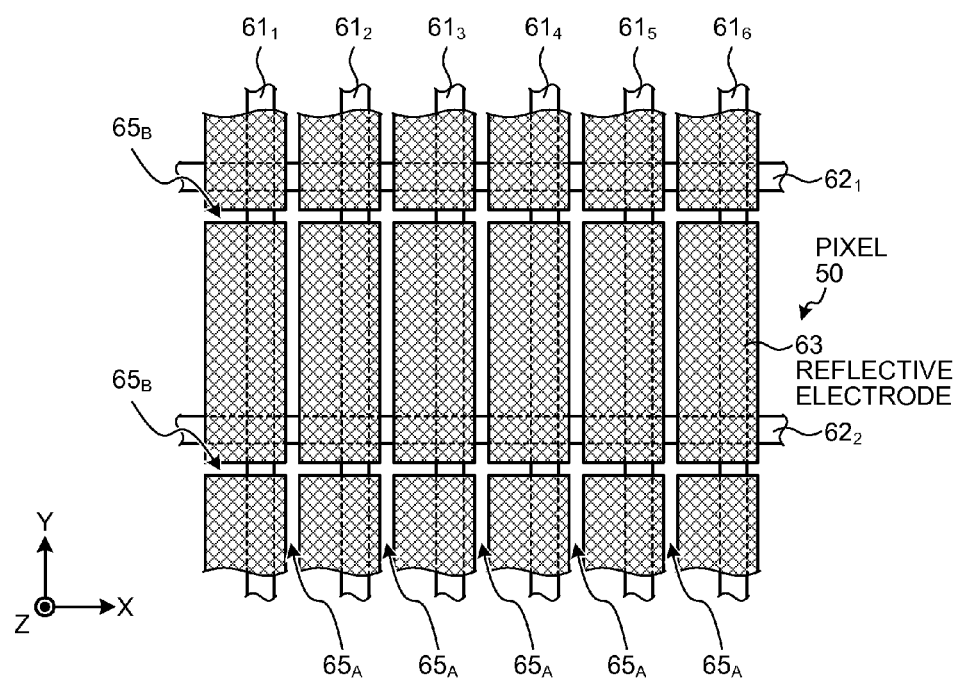
FIG. 4 is a plan view of an electrode structure of a pixel unit according to an embodiment.

To carry out transmissive display while maintaining reflective display performance equivalent to that of a reflective display device, the semi-transmissive liquid crystal display device 1 according to an embodiment of the present disclosure carries out transmissive display using a space of the reflective electrodes 63 between the pixels 50. Specifically, as illustrated in FIG. 4, the signal lines 61, the scanning lines 62, and other lines are arranged so as not to block the space of the reflective electrodes 63 between the pixels 50 in the pixel unit formed of the pixels 50 arranged in a matrix. Thus, the semi-transmissive liquid crystal display device 1 can carry out transmissive display using the space as the transmissive display area.

The reflective electrode 63 is indicated by shading in FIG. 4. The spaces of the reflective electrodes 63 between the pixels 50 include a space $65_A$ and a space $65_B$. The space $65_A$ extends along the arrangement direction of the pixels in the pixel columns, that is, along the column direction (Y-direction in FIG. 4). The space $65_B$ extends along the arrangement direction of the pixels in the pixel rows, that is, along the row direction (X-direction in FIG. 4). While the signal lines 61 and the scanning lines 62 are described as an example of the wiring formed in the pixel unit in the present embodiment, the wiring formed in the pixel unit is not limited thereto. In other words, all the drive lines (control lines) required for driving (controlling) the pixels 50 are included in the wiring in the present embodiment.

"Not blocking the space" does not mean absence of an area in which the wiring overlaps with the space $65_A$ or $65_B$ of the reflective electrodes 63 between the pixels 50. Specifically, the concept of "not blocking the space" includes: a state where the signal lines 61 arranged in the column direction overlap with the spaces $65_B$ extending in the row direction; and a state where the scanning lines 62 arranged in the row direction overlap with the spaces $65_A$ extending in the column direction.

Furthermore, the concept of "not blocking the space" also includes: a state where the signal lines 61 partially or in a part thereof overlap with the spaces $65_A$ extending in the column direction; and a state where the scanning lines 62 partially or in a part thereof overlap with the spaces $65_B$ extending in the row direction. In both the cases, areas in which the signal line 61 and the scanning line 62 overlap with neither of the spaces $65_A$ and $65_B$ are used as the transmissive display area.

To form the wiring so as not to block the spaces $65_A$ and $65_B$ of the reflective electrodes 63 between the pixels 50, the wiring is preferably formed in a manner avoiding at least either one of the spaces $65_A$ and $65_B$ of the reflective electrodes 63 between the pixels 50. "Avoiding the spaces" means a state where the wiring is not present in the space $65_A$ or $65_B$ of the reflective electrodes 63 between the pixels 50 (that is, at least either one of the spaces $65_A$ and $65_B$ has no area in which the wiring overlaps therewith).

Specifically, as illustrated in FIG. 4, the signal lines 61 are preferably arranged in a manner avoiding the spaces $65_A$ extending in the column direction, that is, in a manner forming no area (portion) thereof overlapping with the spaces $65_A$.

The scanning lines 62 are preferably arranged in a manner avoiding the spaces $65_B$ extending in the row direction, that is, in a manner forming no area thereof overlapping with the spaces $65_B$. The spaces $65_A$ and $65_B$ of the reflective electrodes 63 between the pixels 50 have no area in which the signal lines 61 and the scanning lines 62 overlap therewith, respectively. This makes it possible to use the essentially whole area of the spaces $65_A$ and $65_B$ as the transmissive display area. As a result, the semi-transmissive liquid crystal display device 1 can provide higher transmissive display performance.

As described above, the semi-transmissive liquid crystal display device 1 carries out transmissive display using the space of the reflective electrodes 63 between the pixels 50, that is, using the area of the space as the transmissive display area. Thus, it is not necessary to secure the transmissive display area separately in the pixel 50. Thus, as is clear from the comparison between FIG. 3A and FIG. 4, the semi-transmissive liquid crystal display device 1 can make the size of the reflective electrode 63 equivalent to that of the reflective liquid crystal display device, if the pixels 50 are formed in the same size. As a result, the semi-transmissive liquid crystal display device 1 can carry out transmissive display while maintaining reflective display performance equivalent to that of the reflective display device.

2-1. Method for Driving Liquid Crystal Display Panel

To suppress deterioration of the resistivity (substance-specific resistance) and the like of the liquid crystal caused by continuing to apply a DC voltage having the same polarity to the liquid crystal, the LCD panel (liquid crystal display device) employs a driving method for reversing the polarity of a video signal with respect to the common electric potential $V_{COM}$ at a predetermined period.

Some types of methods for driving the LCD panel are known, including line inversion, dot inversion, and frame inversion. The line inversion is a driving method for reversing the polarity of a video signal at a time period of 1H (H represents a horizontal period) corresponding to one line (one pixel row). The dot inversion is a driving method for alternately reversing the polarity of a video signal for pixels vertically and horizontally adjacent to each other. The frame inversion is a driving method for reversing the polarity of a video signal to be written to all the pixels in one frame corresponding to one screen with the same polarity at a time.

The semi-transmissive liquid crystal display device 1 according to the present embodiment can employ any one of the driving methods described above. The semi-transmissive liquid crystal display device 1 preferably employs the frame-inversion driving method rather than the line-inversion or dot-inversion driving method for the reasons described below.

Figure 5A:
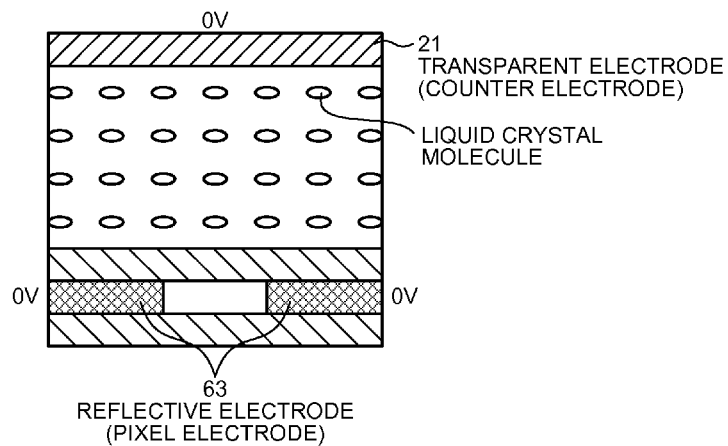
FIG. 5A is a diagram of a simulation result for explaining a reason why a frame-inversion driving method is preferably employed when no voltage is applied.
Figure 5B:
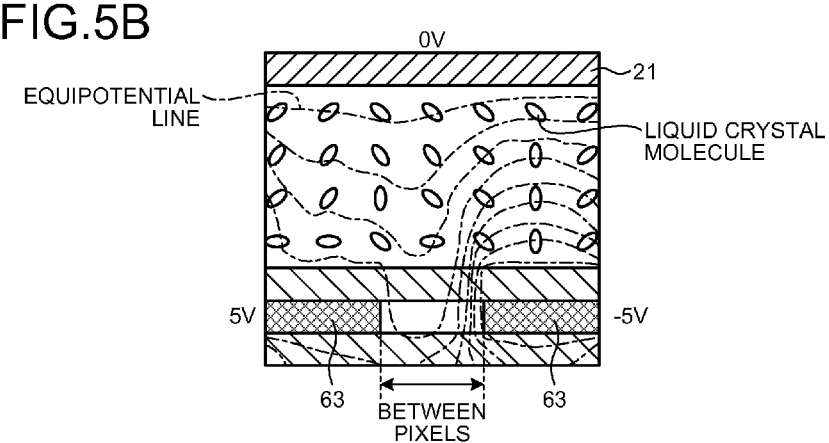
FIG. 5B is a diagram of a simulation result for explaining a reason why the frame-inversion driving method is preferably employed when a voltage is applied in line inversion or dot inversion.
Figure 5C:
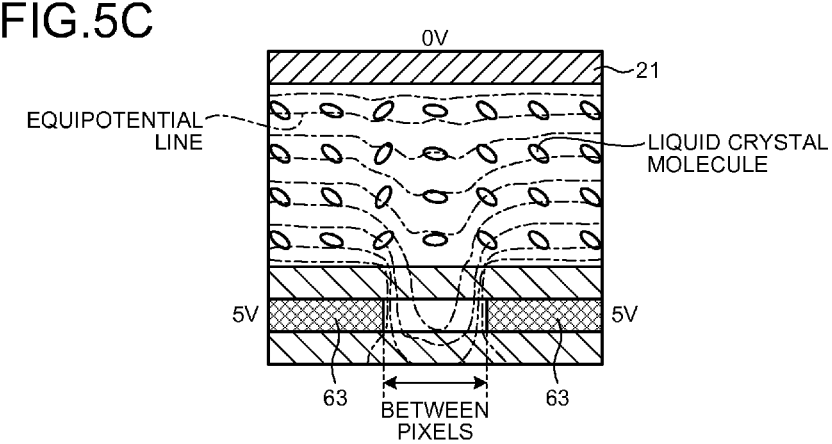
FIG. 5C is a diagram of a simulation result for explaining a reason why the frame-inversion driving method is preferably employed when a voltage is applied upon frame inversion.

The reason why the semi-transmissive liquid crystal display device 1 preferably employs the frame-inversion driving method will be described with reference to simulation results of FIGS. 5A to 5C. In FIGS. 5A to 5C, FIG. 5A illustrates a simulation result obtained when no voltage is applied to the pixels 50. FIG. 5B illustrates a simulation result obtained when a voltage is applied to the pixels 50 in the line inversion or the dot inversion. FIG. 5C illustrates a simulation result obtained when a voltage is applied to the pixels 50 in the frame inversion. In FIG. 5B and FIG. 5C, equipotential lines are represented by dashed-dotted lines.

In the line inversion or the dot inversion, the electric potential between the transparent electrode (counter electrode) 21 and the reflective electrode (pixel electrode) 63 varies between two adjacent pixels. As a result, behavior of liquid crystal molecules between the pixels varies between near one pixel and the other pixel, thereby rendering liquid crystal orientation between the pixels unstable. This is quite evident from distribution of the equipotential lines represented by the dashed-dotted lines in FIG. 5B.

As described above, the line inversion or the dot inversion with the electric potential varying between two adjacent pixels cannot control the liquid crystal orientation between the pixels stably. Transmissive display using the space between the pixels, in which the liquid crystal orientation is unstable, as the transmissive display area may possibly generate a residual image, for example.

By contrast, in the frame inversion, the electric potential between the transparent electrode 21 and the reflective electrode 63 is the same at two adjacent pixels. As a result, the liquid crystal molecules between the pixels behave in a similar manner near one pixel and the other pixel. Thus, the liquid crystal orientation between the pixels is more stable in the frame-inversion driving method than in the line inversion or the dot inversion. This is quite evident from distribution of the equipotential lines represented by the dashed-dotted lines in FIG. 5C.

As described above, the frame inversion having the same electric potential between two adjacent pixels can control the liquid crystal orientation between the pixels relatively stably. As a result, transmissive display using the space between the pixels as the transmissive display area can suppress generation of a residual image effectively. For the reasons described above, the frame-inversion driving method is preferably used rather than the line-inversion or dot-inversion driving method to carry out transmissive display using the space of the reflective electrodes 63 between the pixels 50. As described above, it is not intended to exclude employment of the line-inversion or dot-inversion driving method.

2-2. MIP System

Because the frame-inversion driving method applies a signal voltage having the same polarity to the signal lines during one frame period, shading may possibly occur. To address this, the semi-transmissive liquid crystal display device 1 employs what is called a memory in pixel (MIP) system in the frame-inversion driving method. The MIP system uses a pixel having a memory function, that is, a pixel having a memory capable of storing therein data as the pixel 50, for example. The MIP system constantly applies a steady voltage to the pixel 50, thereby reducing the shading.

The MIP system includes a memory that stores therein data in a pixel, thereby carrying out display in an analog display mode and display in a memory display mode. The analog display mode is a display mode for displaying the gradation of a pixel in an analog manner. The memory display mode is a display mode for displaying the gradation of a pixel in a digital manner based on binary information (logic "1"/logic "0") stored in the memory in the pixel.

Because the memory display mode uses the information stored in the memory, it is not necessary to perform a writing operation of a signal electric potential reflecting the gradation with a frame cycle. Thus, the memory display mode requires lower power consumption than the analog display mode that needs to perform the writing operation of the signal electric potential reflecting the gradation at the frame period. In other words, the memory display mode can reduce the power consumption of the semi-transmissive liquid crystal display device 1.

Figure 6:
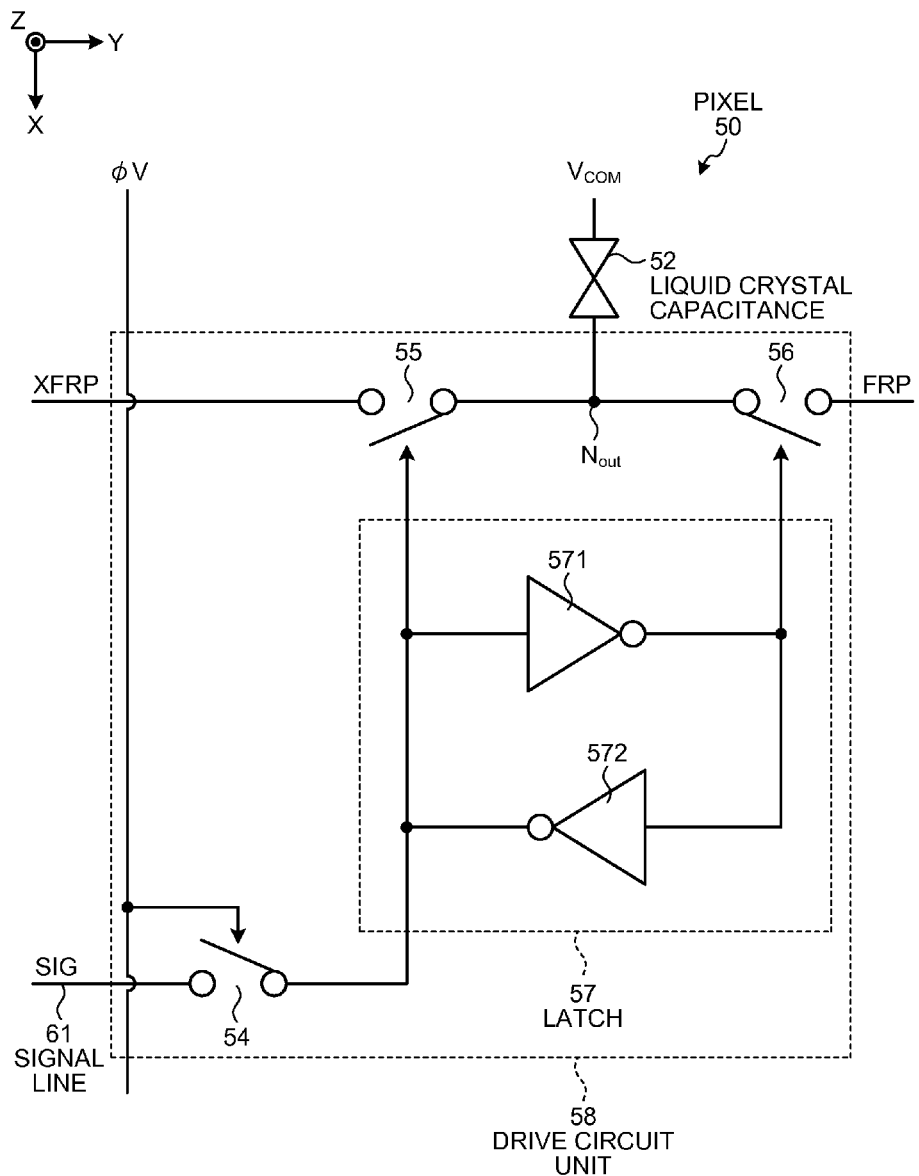
FIG. 6 is a block diagram of an exemplary circuit configuration of a pixel that employs an MIP system.

FIG. 6 is a block diagram of an exemplary circuit configuration of a pixel that employs the MIP system. In FIG. 6, components similar to those in FIG. 2A are denoted by the same reference numerals. FIG. 7 is a timing chart for explaining an operation of the pixel that employs the MIP system.

As illustrated in FIG. 6, the pixel 50 includes a drive circuit unit 58 provided with three switching elements 54 to 56 and a latch 57 in addition to the liquid crystal capacitance (liquid crystal cell) 52. The drive circuit unit 58 has a static random access memory (SRAM) function. The pixel 50 including the drive circuit unit 58 has a pixel configuration with the SRAM function. The liquid crystal capacitance (liquid crystal cell) 52 is a liquid crystal capacitance generated between a pixel electrode (e.g., the reflective electrode 63 in FIG. 4) and a counter electrode arranged in a manner facing the pixel electrode.

One end of the switching element 54 is connected to the signal line 61 (corresponding to the signal lines $61_1$ to $61_3$ in FIG. 2A). Receiving a scanning signal φV from the scanning circuit 80 illustrated in FIG. 2A brings the switching element 54 into an ON (closed) state. Thus, the switching element 54 retrieves data SIG supplied from the signal output circuit 70 illustrated in FIG. 2A via the signal line 61. The latch 57 includes inventors 571 and 572 connected in parallel and opposite to each other. The latch 57 retains (latches) the electric potential corresponding to the data SIG retrieved by the switching element 54.

First ends of the switching elements 55 and 56 are supplied with a control pulse XFRP in the reversed phase of the common electric potential $V_{COM}$ and a control pulse FRP in phase thereof, respectively. Second ends of the switching elements 55 and 56 are commonly connected, and the common connection node serves as an output node $N_{out}$ in the pixel circuit. One of the switching elements 55 and 56 is brought into an ON-state correspondingly to the polarity of the holding potential in the latch 57. Thus, the control pulse FRP or the control pulse XFRP is applied to the pixel electrode (e.g., the reflective electrode 63 in FIG. 4) of the liquid crystal capacitance 52 in which the common electric potential $V_{COM}$ is applied to the counter electrode (e.g., the transparent electrode 21 in FIG. 1).

As is clear from FIG. 7, if the polarity of the holding potential in the latch 57 is negative, the pixel potential of the liquid crystal capacitance 52 is in phase of the common electric potential $V_{COM}$, resulting in black display in the present embodiment. If the polarity of the holding potential in the latch 57 is positive, the pixel potential of the liquid crystal capacitance 52 is in the reversed phase of the common electric potential $V_{COM}$, resulting in white display.

As described above, the pixel 50 in the MIP system brings one of the switching elements 55 and 56 into an ON state in accordance with the polarity of the holding potential in the latch 57. Thus, the control pulse FRP or the control pulse XFRP is applied to the pixel electrode (e.g., the reflective electrode 63 in FIG. 4) of the liquid crystal capacitance 52. As a result, a steady voltage is constantly applied to the pixel 50, thereby suppressing occurrence of shading.

While the explanation has been made of the case where the pixel 50 is provided with an SRAM as the internal memory in the present embodiment, the SRAM is given just as an example. The pixel 50 may be provided with another memory, such as a dynamic random access memory (DRAM), for example.

2-3. Area Coverage Modulation Method

The MIP system can represent only 2 gradations by using 1 bit for each pixel 50. To employ the MIP system in the semi-transmissive liquid crystal display device 1, an area coverage modulation method is preferably used. The area coverage modulation method is a gradation representation method for representing 4 gradations by using 2 bits by weighting a pixel area (an area of the pixel electrode) with 2:1, for example. The area coverage modulation method will be described later in detail.

Specifically, the semi-transmissive liquid crystal display device 1 employs an area coverage modulation method for dividing the reflective electrode 63 (refer to FIG. 4) serving as the reflective display area of the pixel 50 into a plurality of electrodes weighted by the area. The semi-transmissive liquid crystal display device 1 transmits the pixel potential selected based on the holding potential in the latch 57 to the divided pixel electrodes weighted by the area. Thus, the semi-transmissive liquid crystal display device 1 displays the gradations with a combination of the areas thus weighted. Hereinafter, the electrodes obtained by dividing the reflective electrode 63 in a manner weighted by the area may be referred to as the divided pixel electrodes.

The area coverage modulation method will now be specifically described. The area coverage modulation method is a gradation representation method for representing 2×N gradations with N electrodes obtained by weighting an area ratio with $2^0, 2^1, 2^2, \ldots 2^{N-1}$, for example (in the case where each bit for displaying the gradation corresponds to one of electrodes). In the case where each bit for displaying the gradation may correspond to a plurality of electrodes, the area coverage modulation method weights the area ratio of the electrodes corresponding to respective bits with $2^0, 2^1, 2^2, \ldots, 2^{N-1}$, for example, thereby displaying $2^N$ gradations by using N bits.

The area coverage modulation method is employed to reduce non-uniformity of image quality caused by fluctuation in TFT characteristics, for example. The semi-transmissive liquid crystal display device 1 employs a 2-bit area coverage modulation method for representing 4 gradations with the area (pixel area) of the reflective electrode 63 serving as the pixel electrode divided with the weight of 2:1.

Figure 8A:
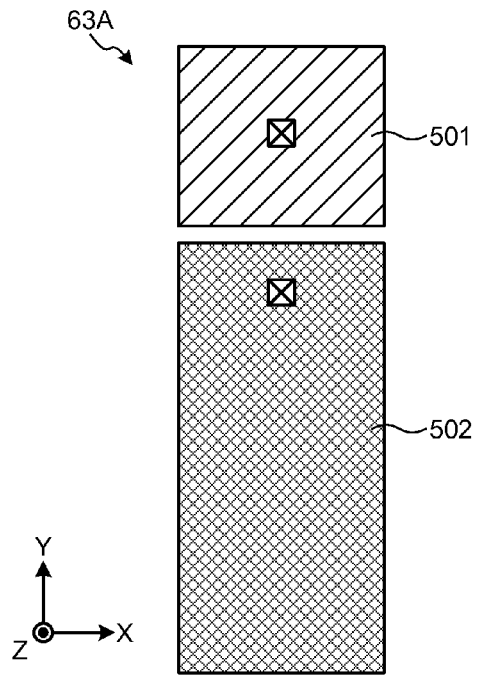
FIG. 8A is a view for explaining pixel division in an area coverage modulation method.

To weight the pixel area with 2:1, the pixel electrode of the pixel 50 is typically divided into a divided pixel electrode 501 with an area S and a divided pixel electrode 502 with an area twice as large as that of the divided pixel electrode 501 (an area 2×S) like a reflective electrode 63A illustrated in FIG. 8A. The structure of the reflective electrode 63A, however, is not preferably used in terms of gradation representation because the centers of gravity of respective gradations are not aligned with (do not coincide with) the center of gravity of one pixel of the pixel 50.

Figure 8B:
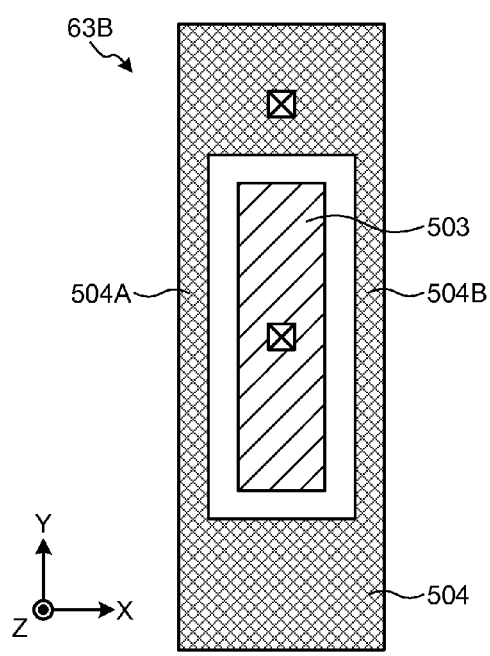
FIG. 8B is another view for explaining pixel division in the area coverage modulation method.

To align the centers of gravity of the respective gradations with the center of gravity of one pixel of the pixel 50, the following structure may be employed: a rectangular area is cut out from the center of a divided pixel electrode 504 with an area 2×S; and a divided pixel electrode 503 with an area S is arranged at the center of the rectangular area thus cut-out like a reflective electrode 63B illustrated in FIG. 8B. In the structure of the reflective electrode 63B, however, connections 504A and 504B of the divided pixel electrode 504 positioned on both sides of the divided pixel electrode 503 have a small width. This reduces the reflective area of the whole divided pixel electrode 504 and makes it difficult to align the liquid crystal around the connections 504A and 504B.

As described above, when a vertical aligned (VA) mode, in which liquid crystal molecules are aligned nearly vertically with respect to the substrate when no electric field is formed, is adopted in area coverage modulation, it is difficult to properly align the liquid crystal. This is because the action of the voltage on the liquid crystal molecules varies depending on the shape, the size, and other elements of the electrode. Furthermore, because the area ratio of the reflective electrodes is not necessarily equal to the reflectance ratio, it is difficult to design the gradation. The reflectance of the reflective electrode is determined by the area of the reflective electrode, the liquid crystal orientation, and other factors. In the structure of the reflective electrode 63A illustrated in FIG. 8A, an area ratio of 1:2 does not make the ratio of the periphery lengths (perimeters) of the electrodes 1:2. An assumption is made as follows: the divided pixel electrode 501 has a square shape in a planar view, and the length of a side is L; and the divided pixel electrode 502 has a rectangular shape in a planar view, the length of a short side is L, and the length of a long side is 2×L, for example. In this case, the perimeter of the divided pixel electrode 501 is 4×L, and the perimeter of the divided pixel electrode 502 is 6×L, thereby deriving a ratio of the perimeters of 2:3. Thus, the area ratio of the reflective electrodes is not necessarily equal to the reflectance ratio.

Figure 8C:
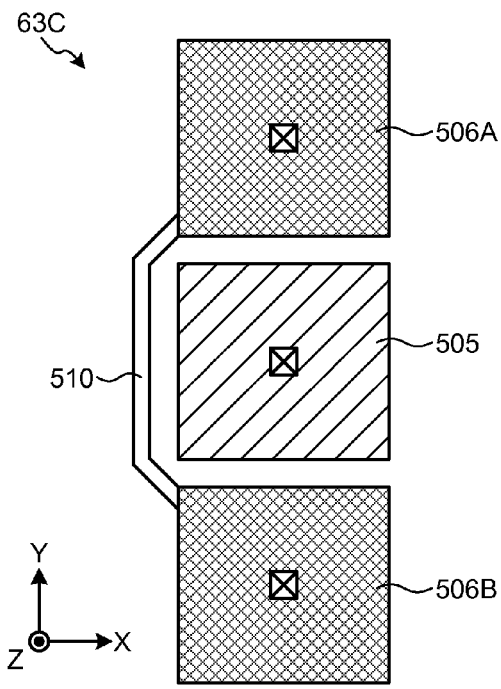
FIG. 8C is still another view for explaining pixel division in the area coverage modulation method.

To employ the area coverage modulation method in consideration of the representability of the gradation and effective use of the reflective area, a reflective electrode 63C is preferably divided into a plurality of (three in this example) divided pixel electrodes 505, 506A, and 506B with the same area (size) as illustrated in FIG. 8C. The reflective electrode 63C includes a plurality of (three in this example) divided pixel electrodes 505, 506A, and 506B. A combination of these areas enables the area coverage modulation.

In the reflective electrode 63C having the electrode structure divided into three, the divided pixel electrodes 506A and 506B are arranged on respective sides of the divided pixel electrode 505. In other words, the three divided pixel electrodes 506A, 505, and 506B are arranged in line in this order. The reflective electrode 63C uses the divided pixel electrodes 506A and 506B arranged on the respective sides of the divided pixel electrode 505 as a pair. The reflective electrode 63C drives the pair of divided pixel electrodes 506A and 506B simultaneously, thereby weighting the pixel area with 2:1 with respect to the divided pixel electrode 505 arranged therebetween.

To drive the two divided pixel electrodes 506A and 506B simultaneously, the two divided pixel electrodes 506A and 506B are preferably connected to each other electrically by a conductor 510 formed of an ITO, for example, as illustrated in FIG. 8C. Electrical connection of the two divided pixel electrodes 506A and 506B enables the two divided pixel electrodes 506A and 506B to be driven by a single drive circuit. As a result, the configuration of the drive circuit unit 58 of a pixel (a sub-pixel in the case of color display) can be simplified compared with the case where the two divided pixel electrodes 506A and 506B are driven by respective drive circuits.

The reflective electrode 63C, more specifically, a sub-pixel (a pixel in the case of carrying out monochrome display alone) including the reflective electrode 63C can perform area coverage modulation for displaying $2^n=4$ gradations by using n=2 bits (n is an integer equal to or more than 2). In this case, the sub-pixel has the respective drive circuit unit 58 illustrated in FIG. 6 for each of the divided pixel electrode 505 and the two divided pixel electrodes 506A and 506B. To perform 2-bit area coverage modulation on the sub-pixel including the reflective electrode 63C, an electrode corresponding to the least significant bit is the divided pixel electrode 505. An electrode corresponding to a bit higher than the least significant bit, that is, corresponding to the most significant bit is the pair of divided pixel electrodes 506A and 506B.

The divided pixel electrodes 506A, 505, and 506B included in the reflective electrode 63C each have a square shape in a planar view, and the length of a side thereof is L. The divided pixel electrodes 506A, 505, and 506B have the same shape and the same size. Thus, the area ratio of the divided pixel electrode 505 to the two divided pixel electrodes 506A and 506B is 1:2. The sum of the perimeter of the divided pixel electrode 505 is 4×L, and the sum of the perimeters of the two divided pixel electrodes 506A and 506B is 8×L. Thus, in the reflective electrode 63C capable of performing area coverage modulation by using n=2 bits, the ratio of the sum of the perimeter of the divided pixel electrode 505 to that of the two divided pixel electrodes 506A and 506B corresponding to respective bits is $1:2^{n-1}=1:2$. The reflective electrode 63C capable of performing area coverage modulation by using n bits (n=2 in this example) can make the area ratio of the electrodes (divided pixel electrodes 505, 506A, and 506B) corresponding to respective bits closer to the reflectance ratio. As a result, the reflective electrode 63C improves the characteristics in gradation display (gradation characteristics).

As described above, the reflective electrode 63C has the two divided pixel electrodes 506A and 506B arranged on the respective sides of the divided pixel electrode 505. In other words, the reflective electrode 63C has the two divided pixel electrodes 506A and 506B arranged symmetrically with respect to the divided pixel electrode 505. The divided pixel electrode 505 is the electrode corresponding to the least significant bit in the area coverage modulation using n bits (n=2). The two divided pixel electrodes 506A and 506B are the electrodes corresponding to a bit (the most significant bit in this example) higher than the least significant bit. Thus, the reflective electrode 63C can align the centers of gravity of respective gradations with the center of gravity of one pixel (one sub-pixel in the case of color display), thereby improving the gradation characteristics.

Figure 8D:
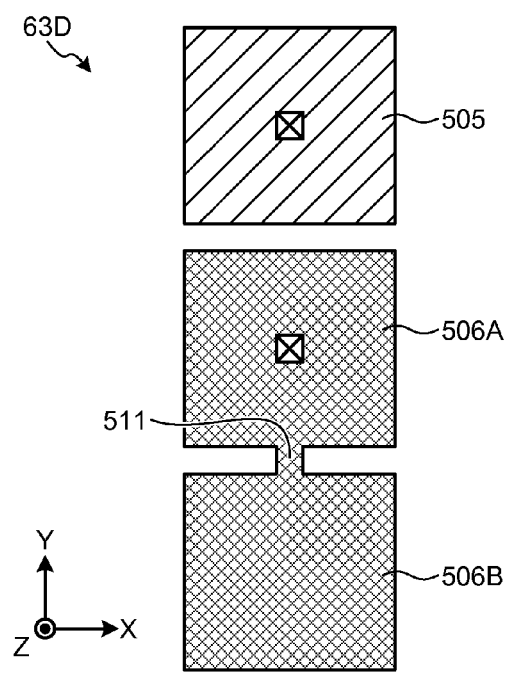
FIG. 8D is still another view for explaining pixel division in the area coverage modulation method.

A reflective electrode 63D illustrated in FIG. 8D is divided into three to include three divided pixel electrodes 505, 506A, and 506B. The reflective electrode 63D performs 2-bit area coverage modulation with an area ratio of 2:1 with a combination of the areas of the two divided pixel electrodes 506A and 506B and the divided pixel electrode 505 among the three divided pixel electrodes 505, 506A, and 506B. The two divided pixel electrodes 506A and 506B are arranged adjacent to each other and are electrically connected by a conductor 511 on the same plane. The divided pixel electrode 506A of the two divided pixel electrodes 506A and 506B is adjacent to the divided pixel electrode 505. The divided pixel electrode 505 is an electrode corresponding to the least significant bit. The two divided pixel electrodes 506A and 506B are electrodes corresponding to a bit higher than the least significant bit, more specifically, corresponding to the most significant bit.

The conductor 511 is made of the same material as that of the two divided pixel electrodes 506A and 506B. The conductor 511 is formed on the same plane as that of the two divided pixel electrodes 506A and 506B integrally therewith. "The conductor 511 is formed on the same plane as that of the two divided pixel electrodes 506A and 506B integrally therewith" means that the conductor 511 and the two divided pixel electrodes 506A and 506B are formed integrally on the surface of the single planarizing film 15 illustrated in FIG. 1.

In this example, if the three divided pixel electrodes 505, 506A, and 506B have the same shape and the same size, the area and the perimeter of the conductor 511 may not be used to calculate the area ratio and the ratio of the sum of the perimeters of the divided pixel electrode 505 to the two divided pixel electrodes 506A and 506B. The area ratio of the divided pixel electrode 505 to the two divided pixel electrodes 506A and 506B is 1:2. The ratio of the sum of the perimeter of the divided pixel electrode 505 to that of the two divided pixel electrodes 506A and 506B corresponding to respective bits is $1:2^{n-1}=1:2$. Thus, the reflective electrode 63D capable of performing area coverage modulation by using n bits (n=2 in this example) can make the area ratio of the electrodes (divided pixel electrodes 505, 506A, and 506B) corresponding to respective bits closer to the reflectance ratio.

The conductor 511 is arranged between the two divided pixel electrodes 506A and 506B on the same plane to electrically connect the two divided pixel electrodes 506A and 506B. The width (size in the X-direction in FIG. 8D) of the conductor 511 is smaller than the width (size in the X-direction in FIG. 8D) of the divided pixel electrodes 506A and 506B. In the present embodiment, the width of the conductor 511 preferably falls within a range of one-tenth to one-fifth of the width of the divided pixel electrodes 506A and 506B. Formation of the conductor 511 with the width falling within such a range allows the area and the perimeter of the conductor 511 to be ignored in calculation of the area ratio and the sum of the perimeters described above. In the present embodiment, the conductor 511 is arranged at the center in the width direction of the two divided pixel electrodes 506A and 506B. The position of the conductor 511 is not limited thereto as long as the conductor 511 is arranged between the two divided pixel electrodes 506A and 506B.

If at least one of the shapes and the sizes of the three divided pixel electrodes 505, 506A, and 506B is different, the area and the perimeter of the conductor 511 may be used to calculate the area ratio and the ratio of the sum of the perimeters of the divided pixel electrode 505 to the two divided pixel electrodes 506A and 506B. In other words, the area ratio and the ratio of the sum of the perimeters of the divided pixel electrode 505 to the two divided pixel electrodes 506A and 506B are calculated including the area and the perimeter of the conductor 511 (sum of the perimeter of a portion between the two divided pixel electrodes 506A and 506B). To represent 4 gradations by using n=2 bits, the areas and the perimeters of the three divided pixel electrodes 505, 506A, and 506B and the conductor 511 are adjusted such that the area ratio is 1:2 and that the ratio of the sum of the perimeters is 1:2.

To form the reflective electrode 63C illustrated in FIG. 8C, the planarizing film 15 illustrated in FIG. 1 is formed into a two-layer structure. The two divided pixel electrodes 506A and 506B are formed on the surface of a second layer and connected by a conductor of an ITO and the like formed between a first layer and the second layer. This improves the gradation characteristics of the reflective electrode 63C but increases the manufacturing process thereof. In terms of the reflective electrode 63D illustrated in FIG. 8D, the conductor 511 and the two divided pixel electrodes 506A and 506B are integrally formed on the surface of the single planarizing film 15. Thus, the planarizing film 15 illustrated in FIG. 1 can be formed as one layer in the reflective electrode 63D, thereby keeping the number of processes from increasing.

Because the centers of gravity of respective gradations deviate from the center of gravity of one pixel (one sub-pixel in the case of color display) in the reflective electrode 63D, the gradation characteristics of the reflective electrode 63D are slightly inferior to those of the reflective electrode 63C. The gradation characteristics of the reflective electrode 63D, however, may possibly be sufficient to display a relatively simple image alone except for the case where halftone is frequently used like in a natural image. In this case, the use of the reflective electrode 63D for the semi-transmissive liquid crystal display device 1 can reduce the manufacturing process and the manufacturing cost.

An explanation will be made of an example where $2^n$ gradations can be displayed by using a bit number larger than n=2. A reflective electrode 63E illustrated in FIG. 8E and a reflective electrode 63F illustrated in FIG. 8F can perform area coverage modulation for displaying $2^n=8$ gradations by using n=3 bits. The reflective electrode 63E illustrated in FIG. 8E includes one divided pixel electrode 505, two divided pixel electrodes 506A and 506B, and four divided pixel electrodes 507A, 507B, 507C, and 507D. In other words, the reflective electrode 63E is obtained by dividing one electrode into seven.

The two divided pixel electrodes 506A and 506B are electrically connected to each other by a conductor 510. The four divided pixel electrodes 507A, 507B, 507C, and 507D are electrically connected to one another by a conductor 512. In the reflective electrode 63E, the divided pixel electrode 505 is an electrode corresponding to the least significant bit (first bit), the two divided pixel electrodes 506A and 506B are electrodes corresponding to a bit (second bit) next higher than the least significant bit, and the four divided pixel electrodes 507A, 507B, 507C, and 507D are electrodes corresponding to the most significant bit (third bit). The two divided pixel electrodes 506A and 506B corresponding to second bit are electrically connected to each other. The four divided pixel electrodes 507A, 507B, 507C, and 507D corresponding to third bit are electrically connected to one another. Two or more electrodes (divided pixel electrodes) corresponding to respective bits are electrically connected to one another.

Figure 8E:
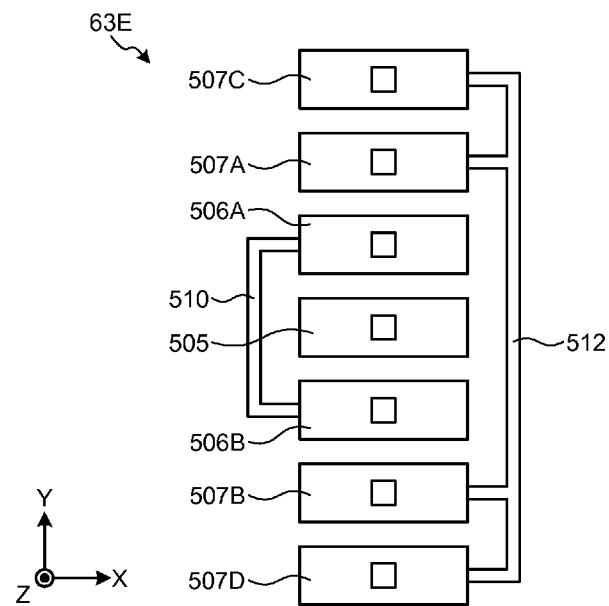
FIG. 8E is still another view for explaining pixel division in the area coverage modulation method.

As illustrated in FIG. 8E, the divided pixel electrodes 506A and 506B corresponding to second bit are arranged on respective sides of the divided pixel electrode 505 corresponding to first bit. The divided pixel electrode 507A among the four divided pixel electrodes 507A, 507B, 507C, and 507D corresponding to third bit is arranged adjacent to the divided pixel electrode 506A. The divided pixel electrode 507B is arranged adjacent to the divided pixel electrode 506B. Furthermore, the divided pixel electrode 507C is arranged adjacent to the divided pixel electrode 507A, and the divided pixel electrode 507D is arranged adjacent to the divided pixel electrode 507B. In the reflective electrode 63E, the two divided pixel electrodes 506A and 506B corresponding to the bit next higher than the least significant bit are arranged on respective sides of the divided pixel electrode 505 corresponding to the least significant bit. Furthermore, the four divided pixel electrodes 507A, 507B, 507C, and 507D corresponding to the bit higher than that of the two divided pixel electrodes 506A and 506B are arranged two by two on respective sides of the divided pixel electrodes 506A and 506B arranged in a manner sandwiching the divided pixel electrode 505. In the reflective electrode 63E, the electrodes corresponding to the bits higher than the least significant bit are symmetrically arranged with respect to the divided pixel electrode 505 serving as the electrode corresponding to the least significant bit.

Figure 8F:
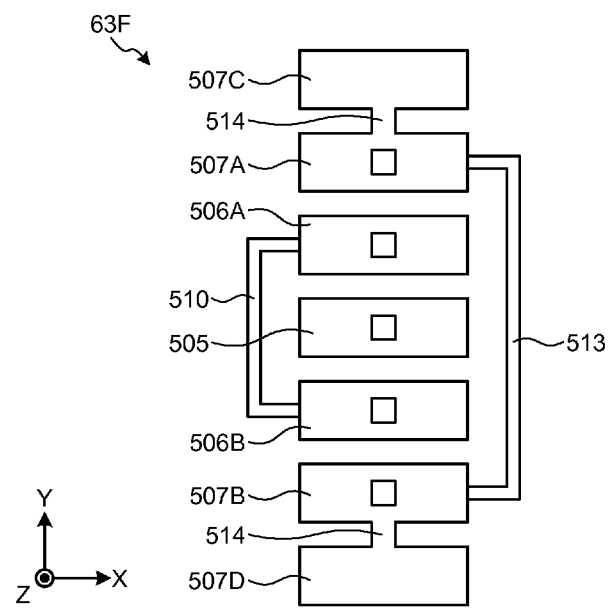
FIG. 8F is still another view for explaining pixel division in the area coverage modulation method.

The reflective electrode 63F illustrated in FIG. 8F is similar to the reflective electrode 63E illustrated in FIG. 8E except for the following points: the two divided pixel electrodes 507A and 507C arranged on the divided pixel electrode 506A side among the four divided pixel electrodes 507A, 507B, 507C, and 507D corresponding to the most significant bit (third bit in this example) are electrically connected by a conductor 514 on the same plane; the two divided pixel electrodes 507B and 507D arranged on the divided pixel electrode 506B side are electrically connected by the conductor 514 on the same plane; and the two divided pixel electrodes 507A and 507B among the four divided pixel electrodes 507A, 507B, 507C, and 507D are electrically connected to each other by a conductor 513.

Similarly to the reflective electrode 63D illustrated in FIG. 8D, if the seven divided pixel electrodes 505, 506A, 506B, 507A, 507B, 507C, and 507D included in the reflective electrode 63F have the same shape and the same size, the area and the perimeter of the conductor 514 may not be used to calculate the area ratio and the ratio of the sum of the perimeters described above. Regarding the width (size in the X-direction in FIG. 8F) of the conductor 514 and the position at which the conductor 514 is arranged, the same explanations can be given thereto with those of the reflective electrode 63D.

The seven divided pixel electrodes 505, 506A, 506B, 507A, 507B, 507C, and 507D included in the reflective electrodes 63E and 63F have the same shape and the same size. The ratio (area ratio) of the area of the divided pixel electrode 505 corresponding to first bit, the areas of the two divided pixel electrodes 506A and 506B corresponding to second bit, and the areas of the four divided pixel electrodes 507A, 507B, 507C, and 507D corresponding to third bit is 1:2:4. The ratio of the sum of the perimeter of the divided pixel electrode 505 corresponding to first bit, the sum of the perimeters of the two divided pixel electrodes 506A and 506B corresponding to second bit, and the sum of the perimeters of the four divided pixel electrodes 507A, 507B, 507C, and 507D corresponding to third bit is $1:2:2^{n-1}=1:2:2^2=1:2:4$. Thus, the reflective electrodes 63E and 63F capable of performing area coverage modulation by using n bits (n=3 in this example) can make the area ratio of the electrodes (divided pixel electrodes 505, 506A, 506B, 507A, 507B, 507C, and 507D) corresponding to respective bits closer to the reflectance ratio.

To carry out transmissive display, the reflective electrodes 63A to 63F transmit backlight not only through the spaces $65_A$ and $65_B$ of the reflective electrodes 63 between the pixels 50 as illustrated in FIG. 4 but also through the spaces between adjacent divided pixel electrodes among the divided pixel electrodes 501, 502, 505, 506A, 506B, and the like. The semi-transmissive liquid crystal display device 1 including one of the reflective electrodes 63A to 63F carries out transmissive display using at least the spaces $65_A$ and $65_B$ of the reflective electrodes 63 between the pixels 50.

A pixel (color pixel) 5a illustrated in FIG. 9A, which is configured to display a color image, includes sub-pixels (pixels) 50R, 50G, and 50B corresponding to colors of R, G, and B, respectively. The sub-pixels 50R, 50G, and 50B each include a reflective electrode 63C having three divided pixel electrodes 505, 506A, and 506B. The reflective electrode 63C is the same as that illustrated in FIG. 8C. The sub-pixel 50R corresponding to R includes a color filter 22R, the sub-pixel 50G corresponding to G includes a color filter 22G, and the sub-pixel 50B corresponding to B includes a color filter 22B. The sub-pixels 50R, 50G, and 50B are partitioned by a black matrix BM. The areas between the black matrixes BM are openings OP of the sub-pixels 50R, 50G, and 50B. The sub-pixels 50R, 50G, and 50B can perform area coverage modulation of 4 gradations by using n=2 bits.

A pixel (color pixel) 5b illustrated in FIG. 9B, which is configured to display a color image, includes sub-pixels 50Rb, 50Gb, and 50Bb corresponding to colors of R, G, and B, respectively. The sub-pixels 50Rb, 50Gb, and 50Bb each include a reflective electrode 63b having three divided pixel electrodes 505b, 506Ab, and 506Bb. The divided pixel electrodes 506Ab, 505b, and 506Bb are electrodes having a rectangular shape in a planar view and extending in the column direction of the color pixel 5b (Y-direction in FIG. 9B). The divided pixel electrodes 506Ab, 505b, and 506Bb have the same shape and the same size.

The divided pixel electrodes 506Ab, 505b, and 506Bb are arranged in the row direction of the color pixel 5b (X-direction in FIG. 9B) in this order. The divided pixel electrodes 506Ab and 506Bb are electrically connected by a conductor formed of an ITO, for example. This configuration enables the sub-pixels 50Rb, 50Gb, and 50Bb to perform area coverage modulation of 4 gradations by using n=2 bits with the divided pixel electrode 505b and the divided pixel electrodes 506Ab and 506Bb.

The sub-pixel 50Rb corresponding to R includes a color filter 22R, the sub-pixel 50Gb corresponding to G includes a color filter 22G, and the sub-pixel 50Bb corresponding to B includes a color filter 22B. Parts of the color filters 22R and 22G included in the sub-pixels 50Rb and 50Gb, respectively, overlap with each other. Parts of the color filters 22G and 22B included in the sub-pixels 50Gb and 50Bb, respectively, overlap with each other. Portions at which the color filters 22R and 22G overlap with each other and at which the color filters 22G and 22B overlap with each other may be referred to as an overlapping portion OL. The sub-pixels 50Rb, 50Gb, and 50Bb are partitioned by the overlapping portion OL. The areas partitioned by the overlapping portions OL are openings OP of the sub-pixels 50Rb, 50Gb, and 50Bb.

Because the sub-pixels 50R, 50G, and 50B are partitioned by the black matrix BM in the color pixel 5a, no light passes through the spaces between adjacent sub-pixels among the sub-pixels 50R, 50G, and 50B in the row direction. Because the sub-pixels 50Rb, 50Gb, and 50Bb are partitioned by the overlapping portion OL in the color pixel 5b, the spaces between adjacent sub-pixels among the sub-pixels 50Rb, 50Gb, and 50Bb in the row direction have light lower transmittance than that of the spaces between adjacent sub-pixels among the sub-pixels 50Rb, 50Gb, and 50Bb in the column direction.

In the sub-pixels 50R, 50G, and 50B included in the color pixel 5a, the ratio of the sum of the perimeters in the opening OP is $1:2^{2-1}=1:2$. In other words, the sub-pixels 50R, 50G, and 50B have a ratio of the sum of the perimeters that are not in contact with the black matrix BM and are present in the openings OP of 1:2. Thus, even if the black matrix BM blocks light transmitted in the column direction, the sub-pixels 50R, 50G, and 50B can make the area ratio of the electrodes (divided pixel electrodes 505, 506A, and 506B) corresponding to respective bits closer to the reflectance ratio. The same applies to the case where no black matrix BM is used, the sub-pixels 50R, 50G, and 50B are partitioned using overlapping portions between the color filters 22R and 22G and between 22G and 22B, and the amount of light transmitted in the column direction is small.

By contrast, the color pixel 5b has a small amount of transmitted light at a portion of the divided pixel electrode 506Ab or the divided pixel electrode 506Bb adjacent to the overlapping portion OL. For this reason, the sides of the divided pixel electrode 506Ab and the divided pixel electrode 506Bb adjacent to the overlapping portion OL are not used to calculate the ratio of the sum of the perimeters described above. Thus, in the sub-pixels 50Rb, 50Gb, and 50Bb included in the color pixel 5b, the ratio of the sum of the perimeters in the opening OP is not $1:2^2=1:2$. The reason of this result will be specifically described.

Assuming that the length of the long side of the divided pixel electrodes 505b, 506Ab, and 506Bb is L, and the length of the short side thereof is A, the perimeter of each divided pixel electrode is expressed by $2\times(L+A)$. In the sub-pixels 50Rb and 50Bb, the sum of the perimeter of the divided pixel electrode 505b corresponding to the least significant bit is $2\times(L+A)$, and the sum of the perimeters of the divided pixel electrodes 506Ab and 506Bb corresponding to the most significant bit is $2\times(L+A)+L+2\times A=3\times L+4\times A$. In the sub-pixels 50Rb and 50Bb, the ratio of the sum of the perimeters of the divided pixel electrodes 505b, 506Ab, and 506Bb corresponding to respective bits is $2\times(L+A):3\times L+4\times A$, which is not 1:2.

Similarly, in the sub-pixel 50Gb, the sum of the perimeter of the divided pixel electrode 505b corresponding to the least significant bit is $2\times(L+A)$, and the sum of the perimeters of the divided pixel electrodes 506Ab and 506Bb corresponding to the most significant bit is $2\times(L+2\times A)$. In the sub-pixel 50Gb, the ratio of the sum of the perimeters of the divided pixel electrodes 505b, 506Ab, and 506Bb corresponding to respective bits is $L+A:L+2\times A$, which is not 1:2.

In the sub-pixels 50Rb, 50Gb, and 50Bb, the ratio of the sum of the perimeters in the opening OP is not $1:2^{2-1}=1:2$. As a result, the sub-pixels 50Rb, 50Gb, and 50Bb fail to make the area ratio of the electrodes (divided pixel electrodes 505b, 506Ab, and 506Bb) corresponding to respective bits closer to the reflectance ratio, thereby degrading the gradation characteristics. If the sub-pixels are partitioned by the black matrix BM or the overlapping portion OL, the ratio of the sum of the perimeters that are not in contact with the black matrix BM or the like and are present in the openings OP simply needs to be $1:2:\ldots:2^{n-1}$ like the reflective electrode 63C included in the sub-pixel 50R of the color pixel 5a, for example. This configuration can make the area ratio of the electrodes (divided pixel electrodes 505b, 506Ab, and 506Bb) corresponding to respective bits closer to the reflectance ratio, thereby improving the gradation characteristics. The relation between the gradation and the luminance of the semi-transmissive liquid crystal display device 1 will be described.

Figure 10A:
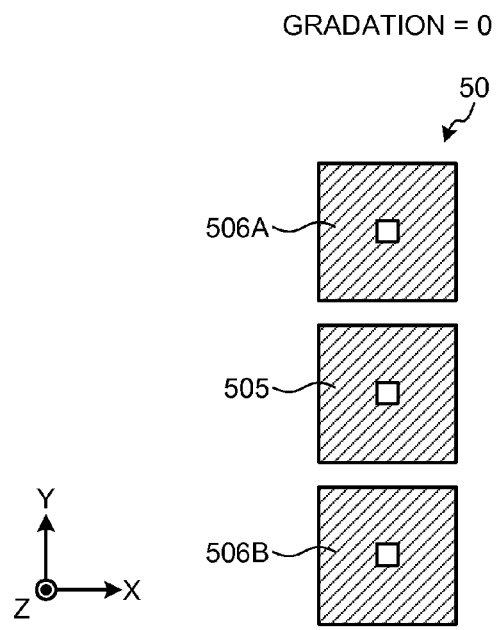
FIG. 10A is a view illustrating gradation=0 in 2-bit area coverage modulation using the semi-transmissive liquid crystal display device according to the embodiment.
Figure 10B:
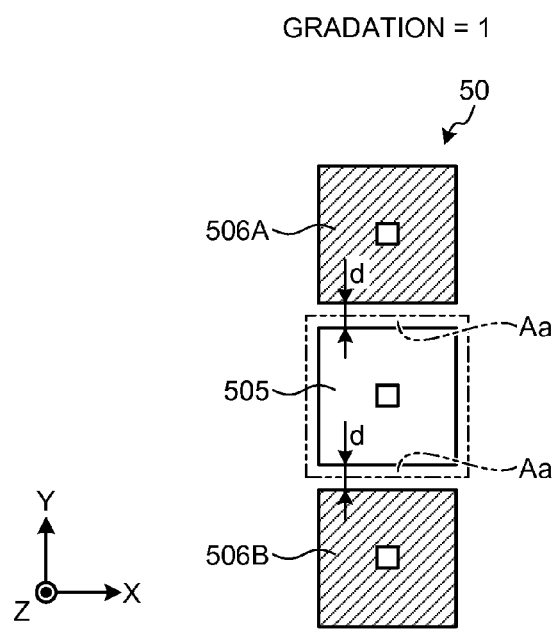
FIG. 10B is a view illustrating gradation=1 in 2-bit area coverage modulation using the semi-transmissive liquid crystal display device according to the embodiment.
Figure 10C:
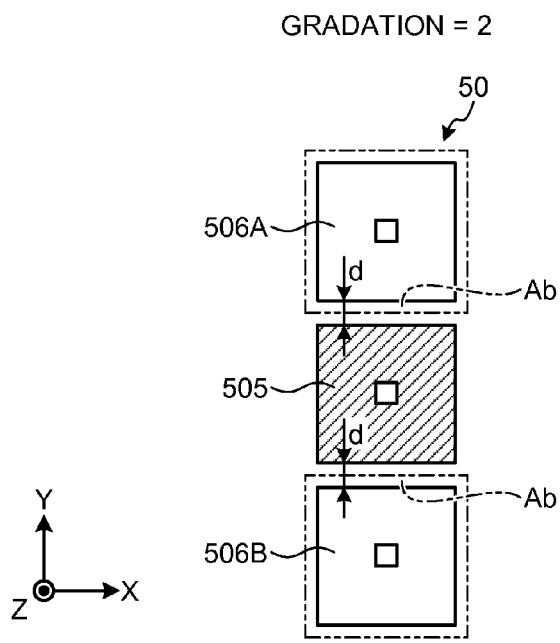
FIG. 10C is a view illustrating gradation=2 in 2-bit area coverage modulation using the semi-transmissive liquid crystal display device according to the embodiment.
Figure 10D:
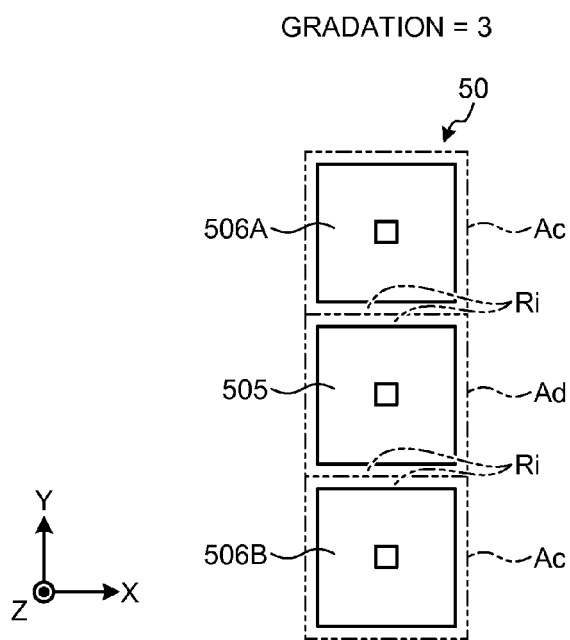
FIG. 10D is a view illustrating gradation=3 in 2-bit area coverage modulation using the semi-transmissive liquid crystal display device according to the embodiment.
Figure 11A:
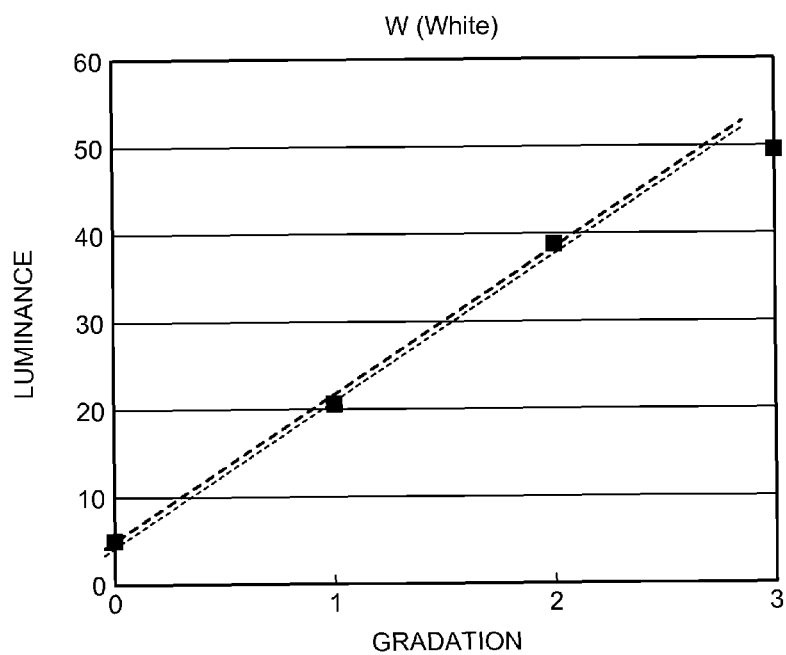
FIG. 11A is a diagram illustrating a relation between the luminance and the gradation in display of white (W)
Figure 11B:
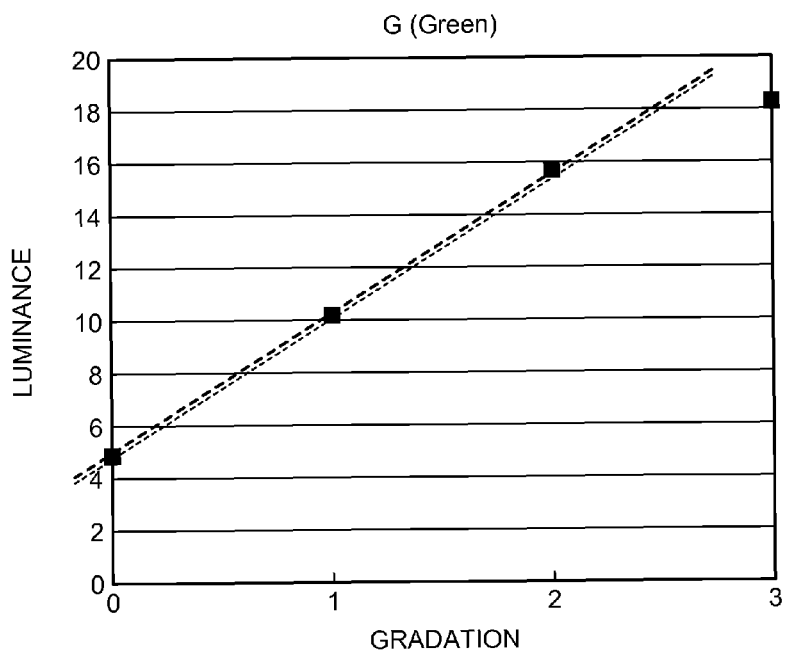
FIG. 11B is a diagram illustrating a relation between the luminance and the gradation in display of green (G)
Figure 11C:
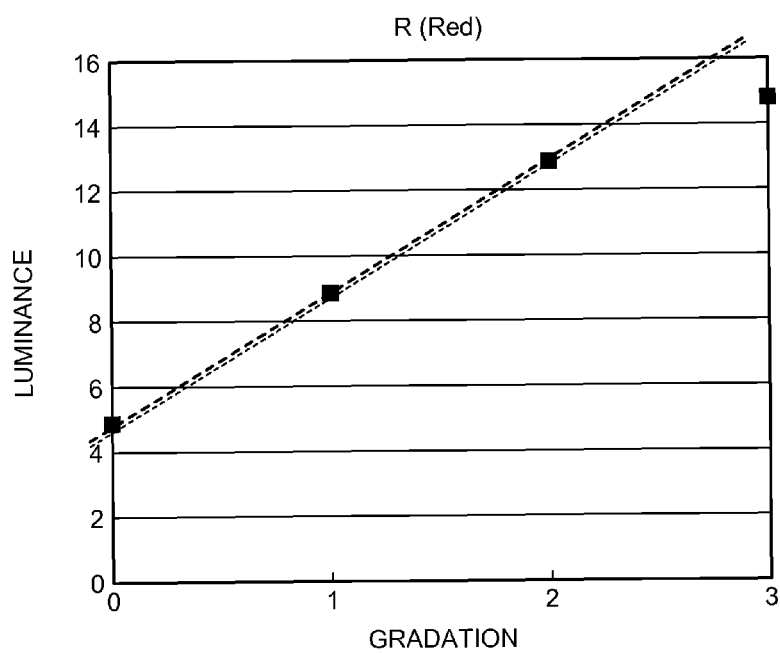
FIG. 11C is a diagram illustrating a relation between the luminance and the gradation in display of red (R)
Figure 11D:
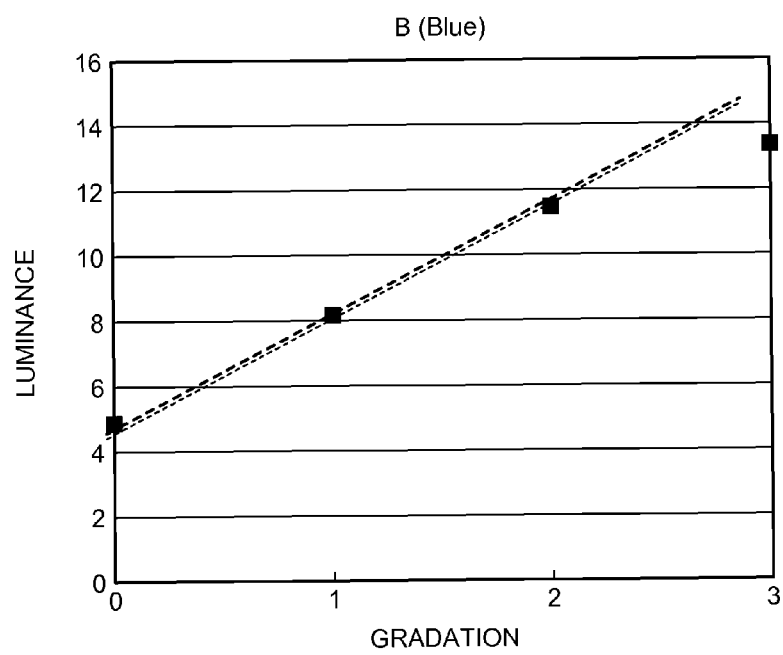
FIG. 11D is a diagram illustrating a relation between the luminance and the gradation in display of blue (B)

FIG. 10A illustrates gradation=0, FIG. 10B illustrates gradation=1, FIG. 10C illustrates gradation=2, and FIG. 10D illustrates gradation=3. In the gradation=0, all the three divided pixel electrodes 505, 506A, and 506B included in the pixel 50 display black. In the gradation=1, the divided pixel electrode 505 displays white, and the two divided pixel electrodes 506A and 506B display black. In the gradation=2, the two divided pixel electrodes 506A and 506B display white, and the divided pixel electrode 505 displays black. In the gradation=3, all the three divided pixel electrodes 505, 506A, and 506B display white.

In the pixel 50, the luminance and the gradation may not possibly be in proportion to each other because of the shapes of the divided pixel electrodes 505, 506A, and 506B, the way to apply the voltage, the degree of propagation of the backlight, or the liquid crystal orientation. The pixel 50 can perform 2-bit area coverage modulation with the divided pixel electrode 505 and the divided pixel electrodes 506A and 506B electrically connected to each other. The divided pixel electrode 505 corresponds to the least significant bit, whereas the divided pixel electrodes 506A and 506B correspond to the most significant bit. FIG. 11A to FIG. 11D illustrate results obtained by measuring the luminance of the pixel 50 and plotting the luminance with respect to the gradation. As illustrated in FIG. 11A to FIG. 11D, the luminance of the pixel 50 is reduced in the gradation=3 compared with in the gradation=1 and gradation=2 in all the colors. This is because adjacent pixels have a great influence on each other in the gradation=3 compared with in the gradation=1 and gradation=2.

As illustrated in FIG. 10B, for example, because a voltage is applied only to the divided pixel electrode 505 of the pixel 50 in the gradation=1, the divided pixel electrode 505 is not affected by the divided pixel electrodes 506A and 506B adjacent thereto. Assuming that a distance between the divided pixel electrode 505 and each of the divided pixel electrodes 506A and 506B is d, the divided pixel electrode 505 in the gradation=1 causes liquid crystal molecules in an area Aa beyond d/2 from the divided pixel electrode 505 to move.

As illustrated in FIG. 10C, a voltage is applied to the divided pixel electrodes 506A and 506B of the pixel 50 in the gradation=2. Because the divided pixel electrodes 506A and 506B are arranged on respective sides of the divided pixel electrode 505 to which no voltage is applied, the divided pixel electrodes 506A and 506B are not affected by the divided pixel electrode 505. Thus, the divided pixel electrodes 506A and 506B in the gradation=2 cause liquid crystal molecules in areas Ab beyond d/2 from the divided pixel electrodes 506A and 506B to move, respectively.

As illustrated in FIG. 10D, a voltage is applied to the divided pixel electrodes 505, 506A, and 506B of the pixel 50 in the gradation=3. Thus, the divided pixel electrodes 505, 506A, and 506B are affected by one another at portions adjacent to one another. As a result, the divided pixel electrodes 506A and 506B in the gradation=3 cause only liquid crystal molecules in areas of up to d/2 from the divided pixel electrodes 506A and 506B, that is, in areas represented by Ri of areas Ac to move at the portions adjacent to the divided pixel electrode 505. The divided pixel electrode 505 in the gradation=3 cause only liquid crystal molecules in an area of up to d/2 from the divided pixel electrode 505, that is, in an area represented by Ri of an area Ad to move at the portions adjacent to the divided pixel electrode 506A or 506B.

In the gradation=1, the liquid crystal molecules move beyond d/2 from the divided pixel electrode 505 all around the divided pixel electrode 505. In the gradation=2, the liquid crystal molecules move beyond d/2 from the divided pixel electrodes 506A and 506B all around the divided pixel electrodes 506A and 506B. In the gradation=3, the divided pixel electrode 505 causes the liquid crystal molecules to move beyond d/2 from the divided pixel electrode 505 at two sides thereof and move up to d/2 from the divided pixel electrode 505 at the other two sides thereof. The divided pixel electrodes 506A and 506B cause the liquid crystal molecules to move beyond d/2 from the divided pixel electrodes 506A and 506B at three sides thereof and move up to d/2 from the divided pixel electrodes 506A and 506B at the other one side thereof, respectively. The size of the area in which the liquid crystal molecules move around the divided pixel electrodes 505, 506A, and 506B increases in proportion between the gradation=1 and the gradation=2. By contrast, the size of the area in which the liquid crystal molecules move around the divided pixel electrodes 505, 506A, and 506B does not increase in proportion between the gradation=2 and the gradation=3. The luminance and the gradation are not in proportion to each other in the pixel 50 because the size of the area in which the liquid crystal molecules move is not in proportion to the gradation.

Figure 12:
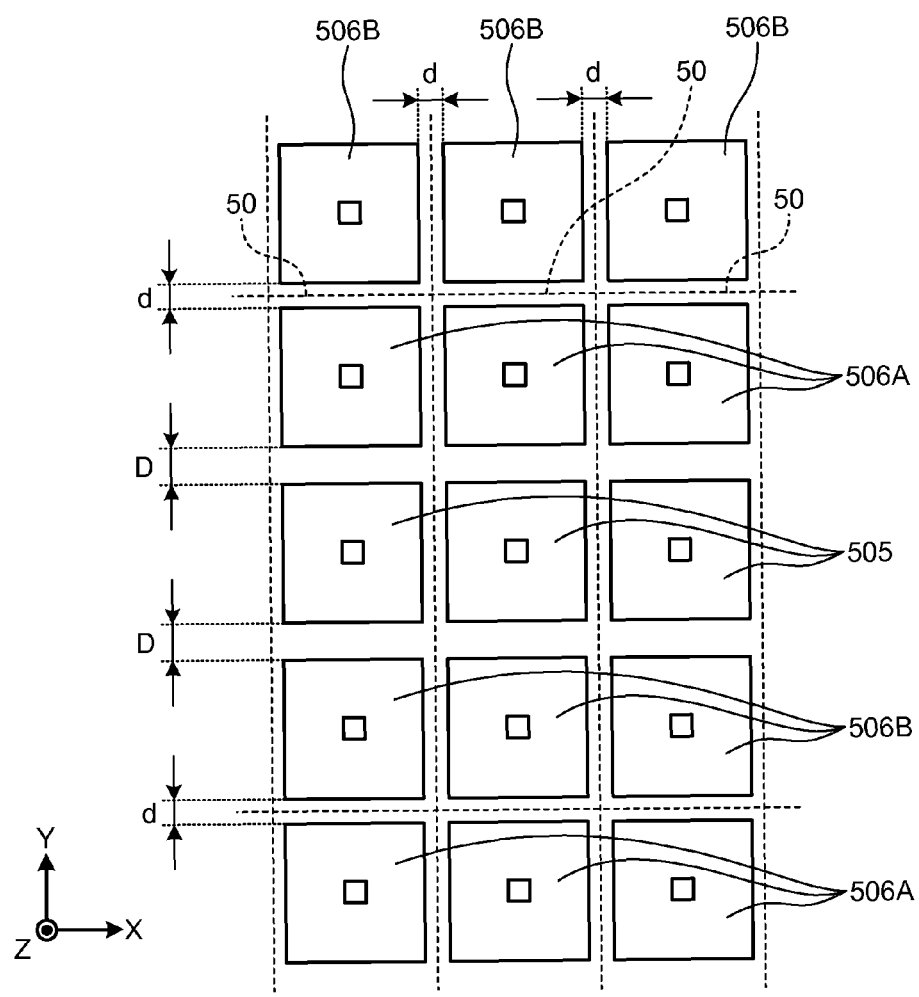
FIG. 12 is a view illustrating a gap between adjacent reflective electrodes.

To address this, the divided pixel electrodes 505, 506A, and 506B serving as a plurality of electrodes included in the pixel 50 are arranged such that the luminance and the gradation change in proportion to each other in the present embodiment. Specifically, as illustrated in FIG. 12, the divided pixel electrodes 506A, 505, and 506B are arranged such that a gap d between the pixels 50 adjacent to each other in the column direction (Y-direction in FIG. 12) is different from a gap D between the divided pixel electrodes 506A and 505 and between 505 and 506B adjacent to each other in one pixel 50. In the present embodiment, d<D is satisfied. In other words, the divided pixel electrodes 506A, 505, and 506B in one pixel 50 are arranged such that the divided pixel electrode 505 corresponding to a lower bit is arranged farther away from divided pixel electrodes adjacent thereto than the divided pixel electrodes 506A and 506B corresponding to a higher bit.

The divided pixel electrodes 505, 506A, and 506B are typically arranged such that the gaps between adjacent electrodes among divided pixel electrodes 505, 506A, and 506B are the same in the row direction (X-direction in FIG. 12) and the column direction. In the present embodiment, the gaps between adjacent electrodes among divided pixel electrodes 505, 506A, and 506B are set as follows: the gap D between the divided pixel electrodes 506A and 505 and between 505 and 506B adjacent to each other in one pixel 50 is made larger than the gap d between the divided pixel electrodes 506A and 506B adjacent to each other in adjacent pixels 50 in the column direction. With this configuration, application of a voltage to all the divided pixel electrodes 505, 506A, and 506B included in the pixel 50 allows the liquid crystal molecules to move beyond one-half of the gap d between adjacent pixels 50 in the areas where the divided pixel electrode 505 is adjacent to the divided pixel electrode 506A or 506B. This increases the luminance in the gradation=3 compared with the case where the gaps between adjacent electrodes among divided pixel electrodes 505, 506A, and 506B are set equal to one another. As a result, the luminance and the gradation change in proportion to each other, thereby improving the gradation characteristics. Furthermore, adjusting the gaps between adjacent electrodes among divided pixel electrodes 505, 506A, and 506B, allows the luminance between the gradations to be adjusted in a relatively simple manner.

As described above, the reflective electrodes 63C to 63F included in the semi-transmissive liquid crystal display device 1 include the divided pixel electrodes 505, 506A, 506B, and the like serving as a plurality of electrodes provided to each of the pixels (sub-pixels in color display) 50 in the present embodiment. The reflective electrodes 63C to 63F can perform area coverage modulation for displaying $2^n$ gradations by using n bits with a combination of the areas of the divided pixel electrodes. The ratio of the sum of the perimeters of the divided pixel electrodes 505, 506A, 506B, and the like corresponding to respective bits is $1:2:\ldots:2^{n-1}$. Thus, the reflective electrodes 63C to 63F capable of performing area coverage modulation by using n bits can make the area ratio of the electrodes (divided pixel electrodes 505, 506A, 506B, and the like) corresponding to respective bits closer to the reflectance ratio, thereby improving the gradation characteristics. Furthermore, the structures of the divided pixel electrodes 505, 506A, 506B, and the like having the same size and the same shape relatively facilitate designing and manufacturing the divided pixel electrodes 505, 506A, 506B, and the like. The explanation has been made of the case where the shape of the divided pixel electrodes 505, 506A, 506B and the like is a square or a rectangle. However, the shape of the divided pixel electrodes 505, 506A, 506B, and the like is not limited to a square or a rectangle as long as the area ratio and the ratio of the sum of the perimeters fall within the range in the present embodiment.

While the explanation has been made of the case where the area coverage modulation method is used to employ the MIP system in the present embodiment, other gradation methods, such as a time-division gradation method, may be used. In the time-division gradation method, however, the pixel potential changes depending on time even in a still image, thereby causing liquid crystal molecules in a pixel and between pixels to move. For this reason, the area coverage modulation method is more preferably used than the time-division gradation method. Furthermore, the area coverage modulation method divides the pixel electrode, that is, the reflective electrode 63, thereby increasing the gap between the electrodes. This advantageously increases the transmittance of the panel compared with the case where the reflective electrode 63 is not divided.

While the explanation has been made of the case where a pixel of MIP having a memory capable of storing therein data is used as a pixel having a memory function, it is given just as an example. Examples of the pixel having a memory function may include a pixel provided with a well-known memory liquid crystal as well as the pixel of MIP.

2-4. Display Mode

Display modes of liquid crystal include a normally white mode and a normally black mode. In the normally white mode, application of no electric field (voltage) causes the liquid crystal to display white, and application of an electric filed causes the liquid crystal to display black. In the normally black mode, application of no electric field causes the liquid crystal to display black, and application of an electric filed causes the liquid crystal to display white. The modes are the same in the structure of the liquid crystal cell and different in the positions of the polarizing plates 11 and 26 illustrated in FIG. 1.

In transmissive display using the space of the reflective electrodes 63 between the pixels 50, not all the liquid crystal molecules between the pixels switch, thereby leaving an area where no liquid crystal molecule moves. In the normally white mode, the area where no liquid crystal molecule moves may possibly prevent the semi-transmissive liquid crystal display device 1 from displaying black sharply, thereby reducing the contrast.

Figure 13:
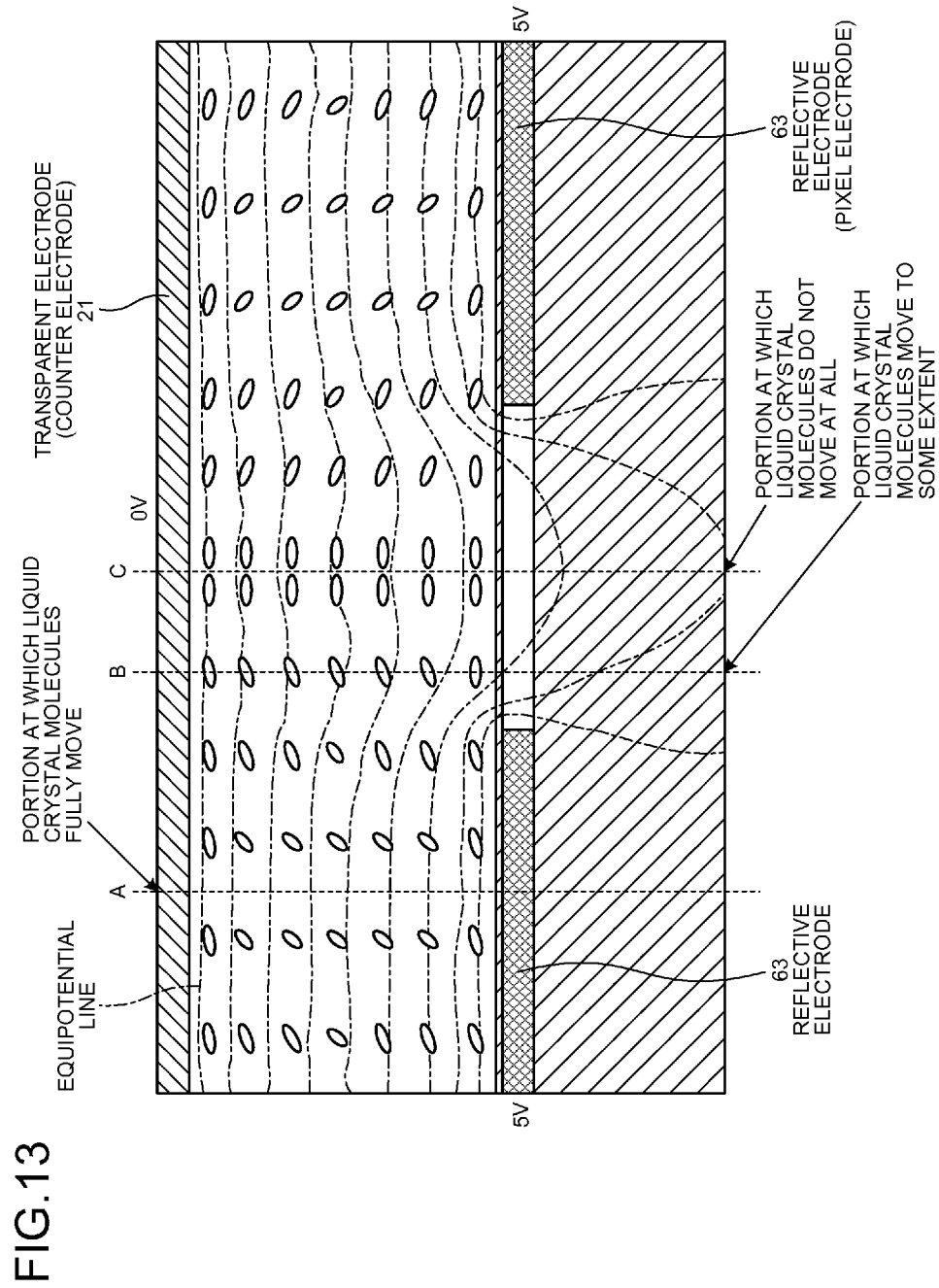
FIG. 13 is a view illustrating movement of liquid crystal molecules between pixels in transmissive display using a space of reflective electrodes between the pixels.

FIG. 13 illustrates movement of liquid crystal molecules between pixels in transmissive display using a space of the reflective electrodes 63 between the pixels. In FIG. 13, the liquid crystal molecules fully move at a position A in the center of the reflective electrode 63. By contrast, the liquid crystal molecules move to some extent at a position B near the reflective electrode 63 between the pixels and do not move at all at a position C in the center between the pixels.

This configuration makes the transmittance in the area in the center between the pixels, at which the liquid crystal molecules do not move at all, extremely higher than that in the area of the reflective electrode 63, thereby causing a leak of light. This prevents the semi-transmissive liquid crystal display device 1 from displaying black sharply, thereby reducing the contrast.

FIG. 14 illustrates a simulation result of the transmittance between the pixels in the normally white mode. Positions A, B, and C in FIG. 14 correspond to the positions A, B, and C in FIG. 13, respectively. The simulation result of FIG. 14 shows that the transmittance is high (e.g., approximately 0.35) at the position C in the center between the pixels in FIG. 13 because the liquid crystal molecules do not move at all.

For this reason, the normally black mode is preferably employed for the display mode of the semi-transmissive liquid crystal display device according to the present embodiment. In the normally black mode, black is displayed when no voltage is applied to the liquid crystal, that is, when the liquid crystal orientation is uniform. This makes it possible to display black sharply, thereby increasing the contrast. It is not intended to exclude employment of the normally white mode.

The following describes an example of observation results of optical characteristics. In the normally white mode, the white transmittance (%) is approximately 0.93, and the black transmittance (%) is approximately 0.29, which provides a contrast of approximately 3. In the normally black mode, the white transmittance (%) is approximately 0.71, and the black transmittance (%) is approximately 0.06, which provides a contrast of approximately 12. In other words, employment of the normally black mode can increase the contrast approximately four times of the normally white mode.

(Overlapping of Color Filters)

Figure 15A:
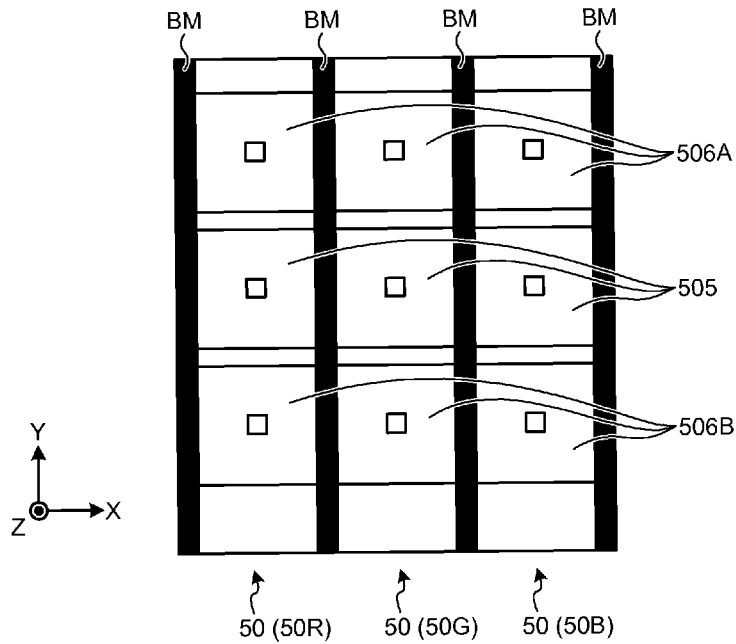
FIG. 15A is a view of color pixels divided with a black matrix.
Figure 15B:
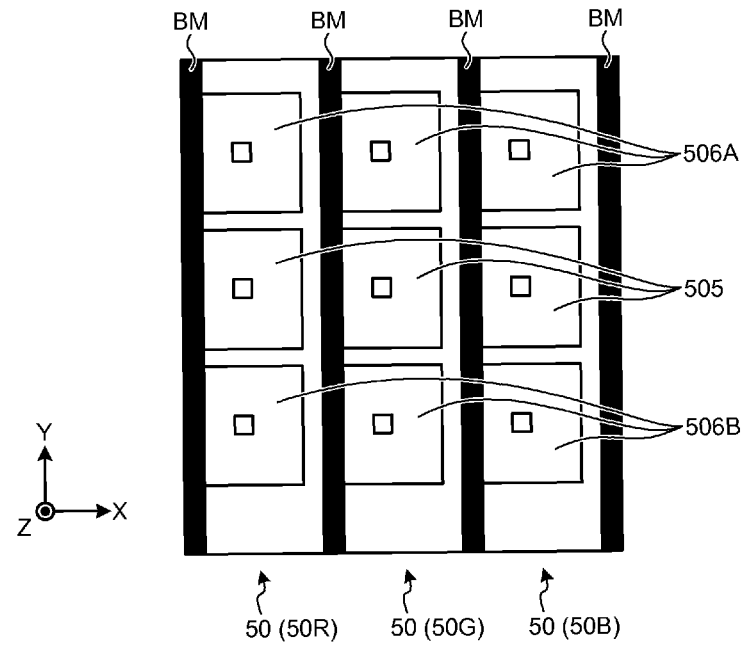
FIG. 15B is another view of the color pixels divided with the black matrix.

To form the color filter 22 on the second substrate 23 facing the first substrate 14 on which the TFT is formed illustrated in FIG. 1, it is necessary to consider deviation caused when superimposing the second substrate 23 on the first substrate 14 (also referred to as superimposing deviation). If the sub-pixels 50R, 50G, and 50B are partitioned using the black matrix BM as a light-blocking zone as illustrated in FIG. 15A, superimposing deviation significantly changes the transmittance as illustrated in FIG. 15B. If the gap between adjacent black matrixes BM is increased such that the black matrix BM is arranged between the pixels 50 even when the superimposing deviation occurs, the reflectance is reduced.

Figure 15C:
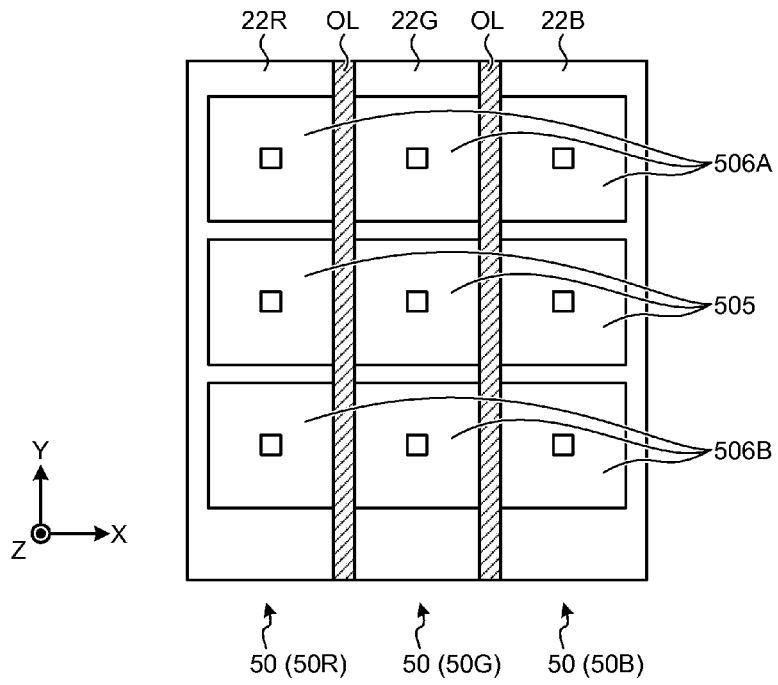
FIG. 15C is a view of color pixels divided with an overlapping potion of color filters.
Figure 15D:
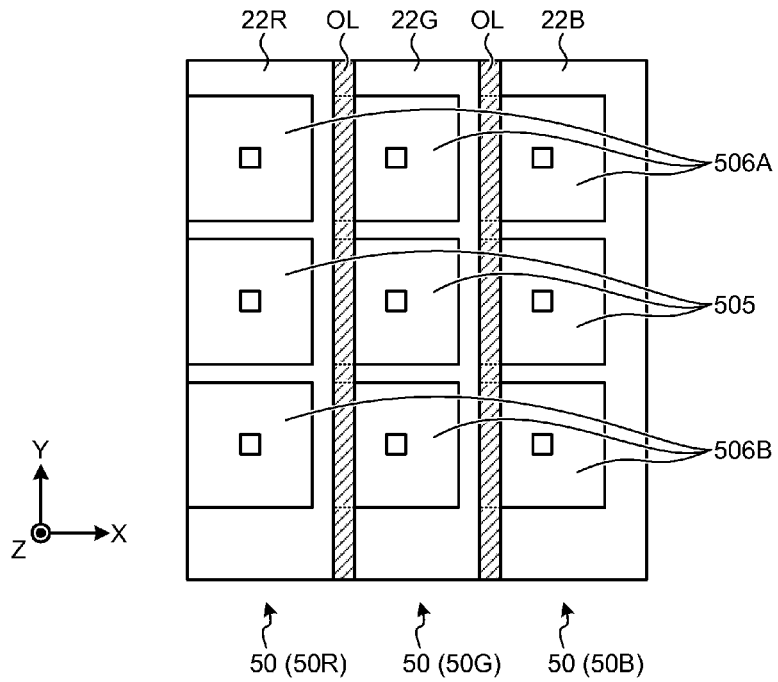
FIG. 15D is another view of the color pixels divided with the overlapping potion of the color filters.

As illustrated in FIG. 15C, parts of the color filters 22R and 22G and parts of the color filters 22G and 22B are each overlapped to partition the sub pixels 50R, 50G, and 50B with the overlapping portions OL. The overlapping portion OL has low transmittance but transmits light to some extent. The use of the overlapping portion OL as the light-blocking zone can reduce a change in the transmittance and the reflectance caused by occurrence of the superimposing deviation as illustrated in FIG. 15D compared with the case where the black matrix BM is used as the light-blocking zone.

(Scattering Layer)

Figure 16:
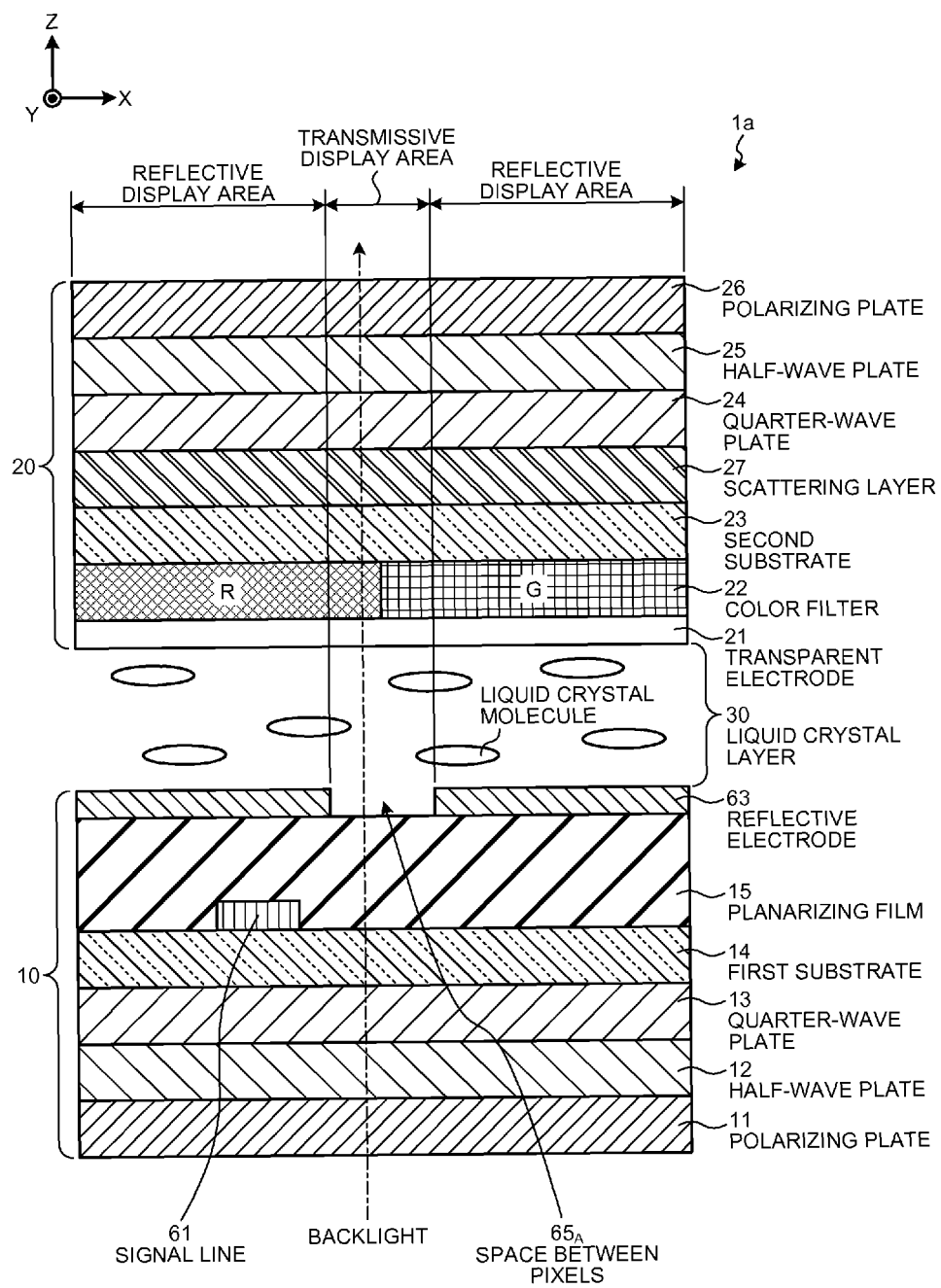
FIG. 16 is a sectional view of an example of a semi-transmissive liquid crystal display device having a scattering layer that scatters light.

A semi-transmissive liquid crystal display device 1a illustrated in FIG. 16 includes a scattering layer 27 that scatters light to the side of a traveling direction of light reflected by a reflective electrode 63 than a liquid crystal layer 30. More specifically, the semi-transmissive liquid crystal display device 1a includes the scattering layer 27 between a second substrate 23 and a quarter-wave plate 24. The scattering layer 27 is an anisotropic or isotropic layer that scatters light reflected by the reflective electrode 63 and backlight passing through a space $65_A$ between pixels. A light control film (LCF), for example, may be used for the scattering layer 27.

The scattering layer 27 is a forward scattering layer that generates large forward scattering and small backward scattering. The scattering layer 27 is an anisotropic scattering layer that scatters light incident in a specific direction. If light is incident in the specific direction from the polarizing plate 26 with respect to the second substrate 23, the scattering layer 27 transmits the incident light almost without scattering the light, and then significantly scatters the light reflected and returned by the reflective electrode 63.

Figure 17:
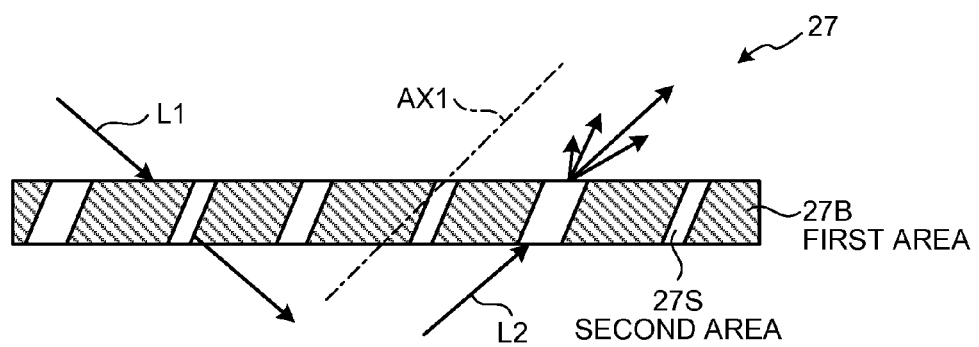
FIG. 17 is a sectional view of the scattering layer.
Figure 18:
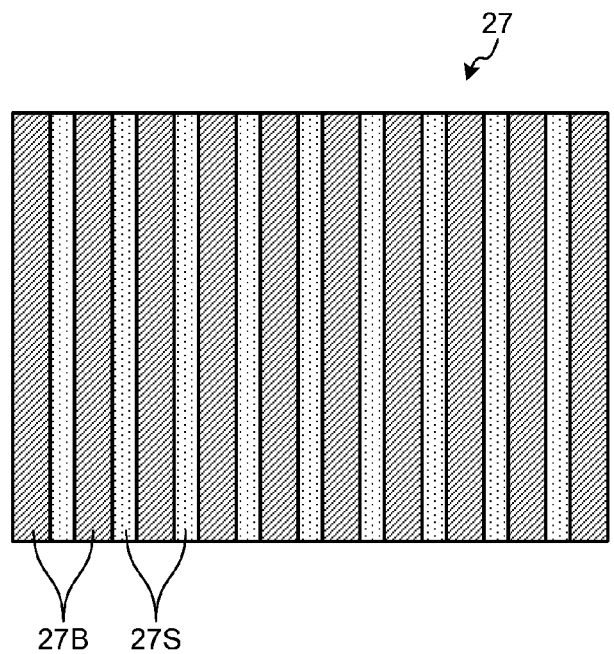
FIG. 18 is a plan view of an example of the scattering layer.
Figure 19:
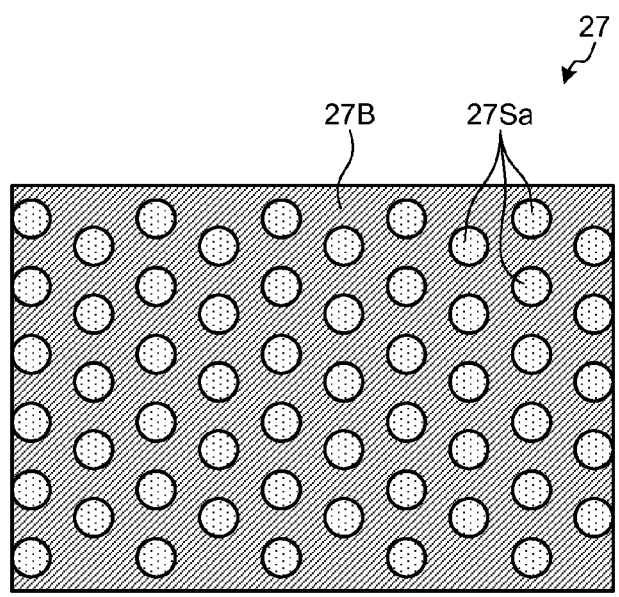
FIG. 19 is a plan view of another example of the scattering layer.

As illustrated in FIG. 17, for example, the scattering layer 27 transmits outer light L1 incident in the specific direction with respect to the second substrate 23. The scattering layer 27 scatters light L2 reflected by the reflective electrode 63 in the transmitted light within a predetermined range with respect to a scattering center axis AX1. The outer light L1 is parallel light incident on the polarizing plate 26 of the second substrate 23. The outer light L1 may be polarized light or non-polarized light. As illustrated in FIG. 17, the scattering layer 27 includes two types of areas (a first area 27B and a second area 27S) having different refractive indexes, for example. The scattering layer 27 may have a louver structure in which a plurality of plate-like second areas 27S are arranged at predetermined intervals in the first area 27B as illustrated in FIG. 18. Alternatively, the scattering layer 27 may have a columnar structure in which columnar second areas 27Sa are arranged in the first area 27B as illustrated in FIG. 19.

The scattering layer 27 is formed of the first area 27B and the second area 27S extending in the thickness direction and inclined in a predetermined direction, for example. The scattering layer 27 is formed by irradiating a resin sheet that is a mixture of two or more types of monomers or oligomers capable of being photopolymerized and having different refractive indexes with ultraviolet rays in an oblique direction, for example. The scattering layer 27 may have a structure different from the structure described above and may be manufactured by a method different from the method described above. The scattering layer 27 may be formed as a single layer or a plurality of layers. If the scattering layer 27 is formed as a plurality of layers, the layers may have the same structure or structures different from one another.

The scattering center axis AX1 of the scattering layer 27 preferably extends in a main visual angle direction, for example. The scattering center axis AX1 may extend in a direction different from the main visual angle direction. In both cases, the direction of the scattering center axis AX1 needs to be set such that the use of the scattering layer 27 makes the luminance in the main visual angle direction the highest, that is, makes the reflectance the highest because of the effect of the scattering layer 27. The "main visual angle" corresponds to a direction in which a user of the semi-transmissive liquid crystal display device 1a views an image display surface when using the semi-transmissive liquid crystal display device 1a. If the image display surface is formed in a rectangular shape, the main visual angle corresponds to a direction orthogonal to a side closest to the user among the sides of the image display surface.

When backlight is transmitted through the space $65_A$ between the pixels, patterning accuracy of the reflective electrode 63 or superimposing deviation of the second substrate 23 may possibly increase fluctuations in transmission of the backlight, for example. Specifically, forming the reflective electrode 63 with silver by a wet process may possibly increase the fluctuations significantly. Because the scattering layer 27 scatters the transmitted light, the fluctuations are leveled advantageously.

2-5. Specific Example

The following describes a specific example of the semi-transmissive liquid crystal display device according to the present embodiment. In the description below, the normally black mode is employed as the display mode, and an electrically controlled birefringence (ECB) mode is employed as an operating mode, for example. The operating mode is not limited to the ECB mode and may be the VA mode or a fringe field switching (FFS) mode, for example.

Figure 20:
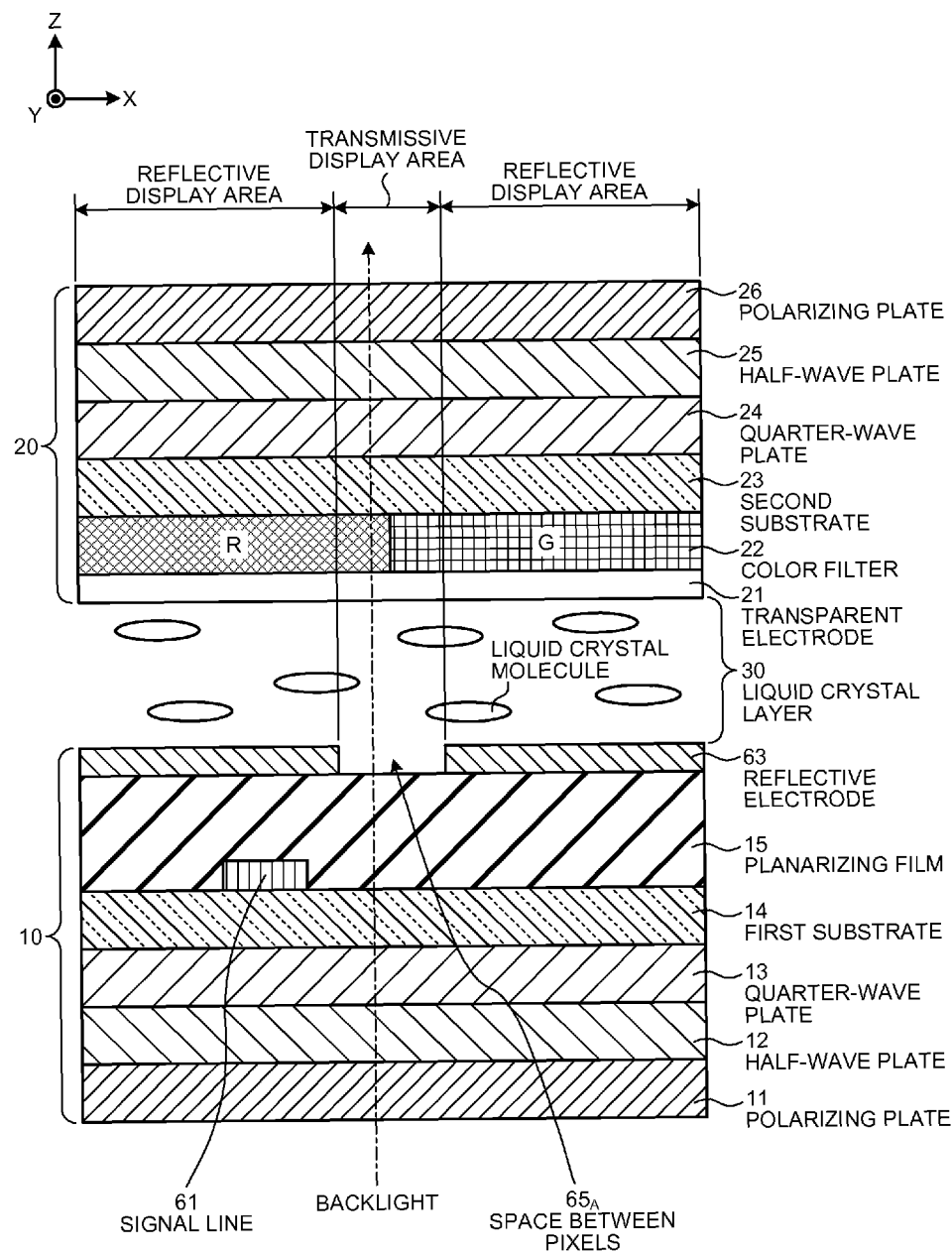
FIG. 20 is a sectional view of a sectional structure of two pixels adjacent to each other in a row direction of a semi-transmissive liquid crystal display device having a single-gap structure.

FIG. 20 is a sectional view of a sectional structure of two pixels adjacent to each other in the row direction (X-direction) of a semi-transmissive liquid crystal display device according to an example of the present embodiment. In FIG. 20, components similar to those in FIG. 1 are denoted by the same reference numerals.

As illustrated in FIG. 20, a first panel unit 10 includes a polarizing plate 11, a half-wave plate 12, a quarter-wave plate 13, a first substrate 14 serving as a TFT substrate, and a planarizing film 15 arranged in this order from the side opposite to a liquid crystal layer 30, and a reflective electrode 63 is formed on the planarizing film 15 for each pixel.

The reflective electrode 63 is formed in nearly the same size as that of a pixel in the first panel unit 10. The area of the reflective electrode 63 serves as the reflective display area (reflective display portion). A space $65_A$ is formed along the column direction (Y-direction) between reflective electrodes 63 of two pixels adjacent to each other in the row direction (X-direction). A space $65_B$, which is not illustrated in this section, is formed along the row direction between reflective electrodes 63 of two pixels adjacent to each other in the column direction as illustrated in FIG. 4.

A signal line 61 that transmits a video signal to the pixels in each pixel column is arranged on the first substrate 14. The signal line 61 is formed in the reflective display area so as not to block the space $65_A$ extending along the column direction, more preferably, not to overlap with the space $65_A$. A scanning line 62 (refer to FIG. 4), which is not illustrated in this section, transmits a scanning signal to the pixels in each pixel row. The signal line 62 is formed in the reflective display area so as not to block the space $65_B$ extending along the row direction, more preferably, not to overlap with the space $65_B$.

The spaces $65_A$ and $65_B$ of the reflective electrodes 63 between the pixels with which the signal line 61 and the scanning line 62 do not overlap are used as the transmissive display area. The pixel structure according to the present example is a single gap structure in which the reflective display area and the transmissive display area have the same thickness of the liquid crystal layer 30, that is, the same cell gap.

A second panel unit 20 faces the first panel unit 10 with the liquid crystal layer 30 interposed therebetween. The second panel unit 20 includes a transparent electrode 21, a color filter 22, a second substrate 23, a quarter-wave plate 24, a half-wave plate 25, and a polarizing plate 26 arranged in this order from the liquid crystal layer 30 side. FIG. 20 illustrates pixel structures of two pixels adjacent to each other in the row direction, that is, a sub-pixel R that displays red and a sub-pixel G that displays green, for example.

Figure 21A:
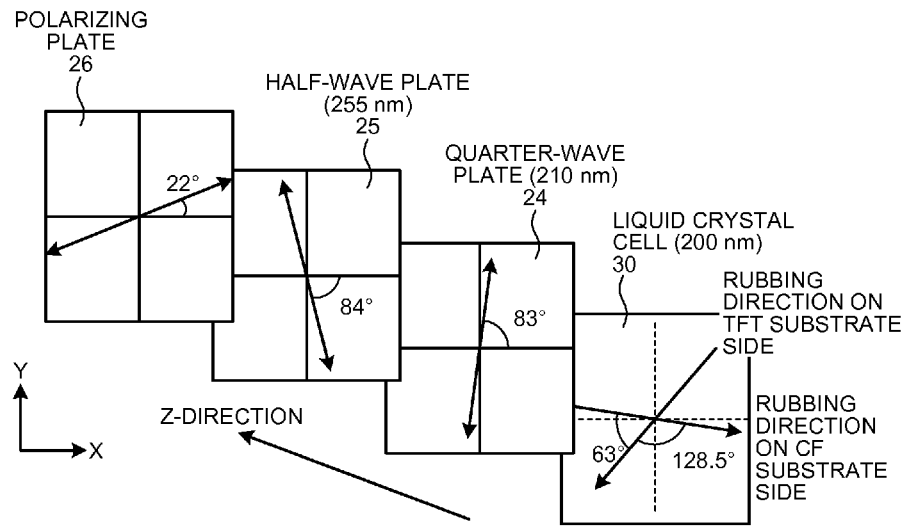
FIG. 21A is a diagram illustrating an example of optical design of a normally black ECB mode in the single-gap structure.
Figure 21B:
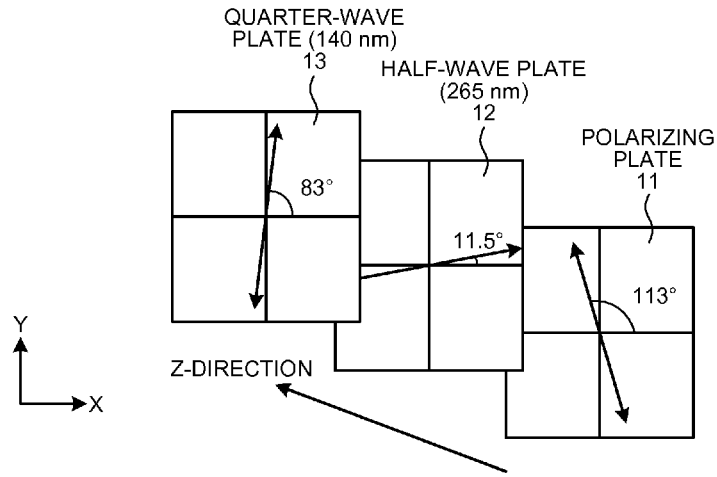
FIG. 21B is another diagram illustrating the example of optical design of the normally black ECB mode in the single-gap structure.

FIG. 21A and FIG. 21B illustrate an example of optical design of a normally black ECB mode in the single-gap structure. FIG. 21A and FIG. 21B illustrate axial directions of components of the first panel unit 10, the liquid crystal cell (liquid crystal layer 30), and components of the second panel unit 20. Specifically, FIG. 21B illustrates the axial directions of the first panel unit 10, including an absorption axial direction of the polarizing plate 11, an extension axial direction of the half-wave plate 12, and an extension axial direction of the quarter-wave plate 14. FIG. 21A illustrates the axial directions of second panel unit 20, including rubbing directions of the liquid crystal cell on the TFT substrate side and the CF substrate side, an extension axial direction of the quarter-wave plate 24, an extension axial direction of the half-wave plate 25, and an absorption axial direction of the polarizing plate 26.

In FIGS. 21A and 21B, each numerical value represents the angle of each axial direction and a phase difference (retardation). The phase difference is a numerical value obtained by converting the phase difference into a wavelength in a case where light at a wavelength of 550 nm is incident on each component of the first panel unit 10 and the second panel unit 20. While the explanation has been made of the single gap structure as a specific example, the pixel structure may be a multi-gap structure in which the reflective display area and the transmissive display area have different cell gaps as illustrated in FIG. 22.

Figure 22:
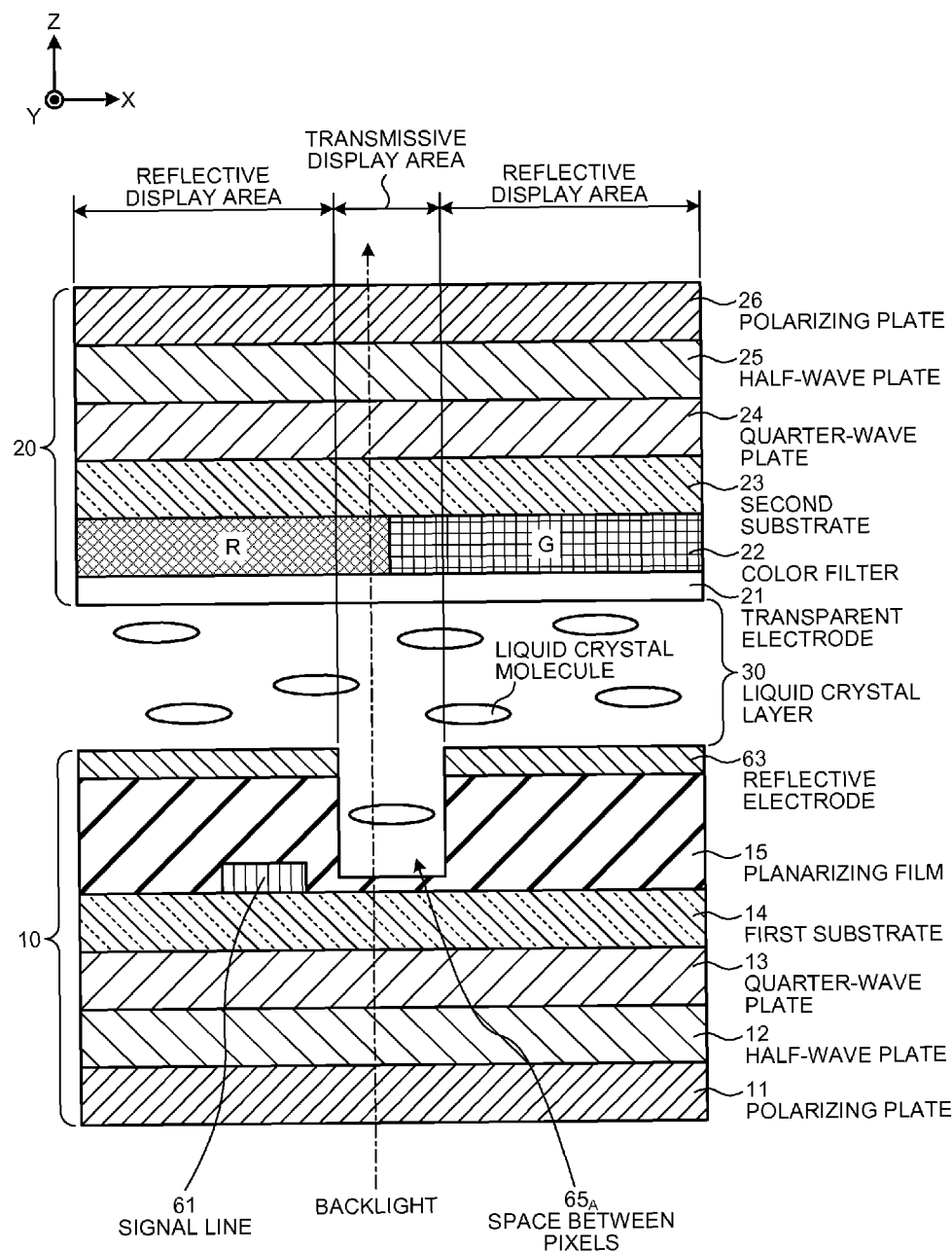
FIG. 22 is a sectional view of a sectional structure of two pixels adjacent to each other in a row direction of a semi-transmissive liquid crystal display device having a multi-gap structure.

In the multi-gap structure, a groove needs to be formed at the space $65_A$ ($65_B$) of the reflective electrodes 63 between pixels so as to form a difference in level between the reflective display area and the transmissive display area as illustrated in FIG. 22. This increases the number of processes compared with the single gap structure. Because the single gap structure can be formed by fewer processes than those of the multi-gap structure, the single gap structure is preferably employed in terms of the process.

Figure 23:
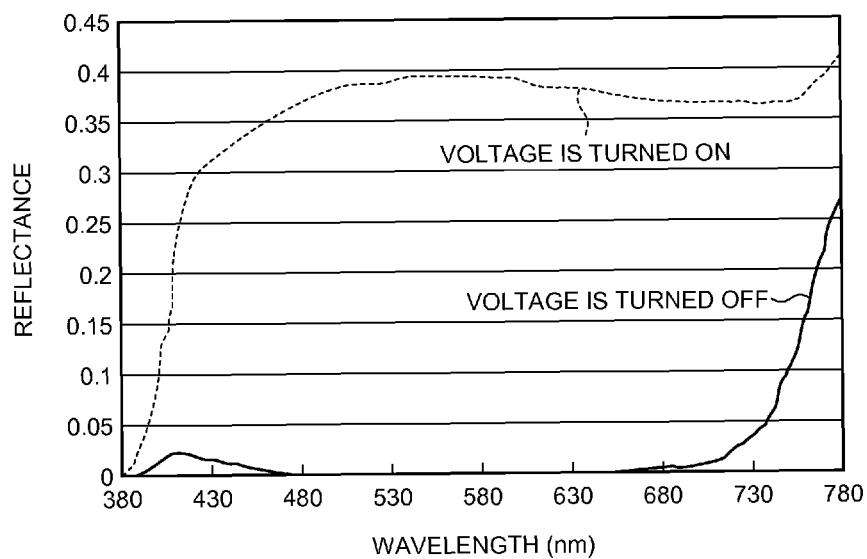
FIG. 23 is a diagram illustrating a calculation result of a spectrum in a reflective display area.
Figure 24:
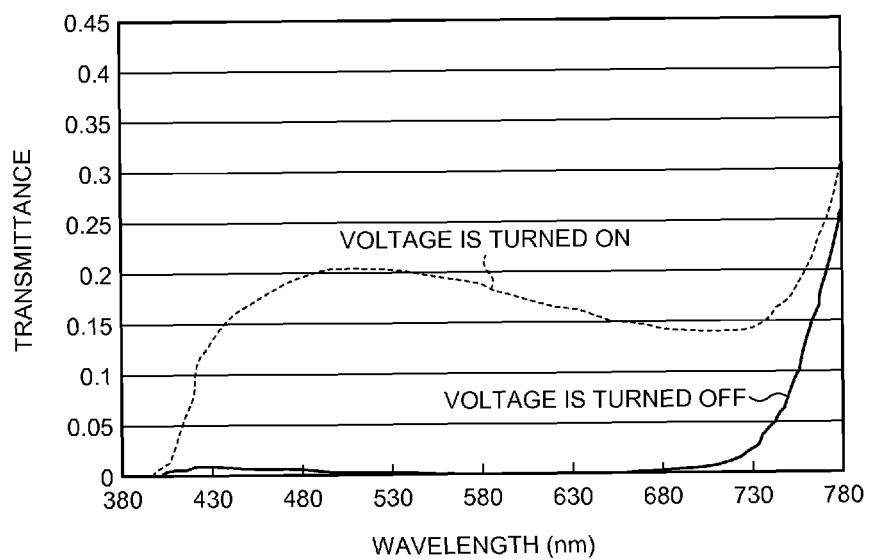
FIG. 24 is a diagram illustrating a calculation result of a spectrum in a transmissive display area.

FIG. 23 and FIG. 24 illustrate calculation results of spectra in the reflective display area and the transmissive display area obtained when a voltage is turned ON or a voltage is turned OFF to the upper and lower electrodes of the counter electrode (transparent electrode 21) and the pixel electrode (reflective electrode 63) in the optical design (single gap structure) illustrated in FIG. 21A and FIG. 21B. "A voltage is turned ON" means a state where a voltage is applied between the upper and lower electrodes, whereas "a voltage is turned OFF" means a state where no voltage is applied between the upper and lower electrodes.

FIG. 23 illustrates a calculation result of a spectrum of the reflectance in the reflective display area. FIG. 24 illustrates a calculation result of a spectrum of the transmittance in the transmissive display area. These calculation results is made based on not the reproduction of the electric field distribution between pixels but a state where the electric field generated by the upper and lower electrodes completely affects the liquid crystal molecules. Because the semi-transmissive liquid crystal display device according to the present example has the single gap structure, the phase difference is small in the transmissive display area unlike a typical semi-transmissive liquid crystal display device having the multi-gap structure. As a result, the semi-transmissive liquid crystal display device according to the present example has low transmittance in the transmissive display.

3. Modifications

The embodiments described above have a wiring structure formed of the signal line 61 and the scanning line 62 each arranged in a linear stripe pattern. The signal line 61 traverses the space $65_B$ extending in the row direction through a position around the center of pixels, whereas the scanning line 62 traverses the space $65_A$ extending in the column direction through a position around the internal position of pixels (refer to FIG. 4). The wiring structure of the signal line 61 and the scanning line 62 described above is given just as an example, and the wiring structure is not limited thereto.

As illustrated in FIG. 25, for example, the signal line 61 and the scanning line 62 may be formed into bent and meandering wiring with the following wiring structure. The signal line 61 is arranged so as to pass through an intersection $65_C$ between the space $65_A$ formed along the column direction and the space $65_B$ formed along the row direction at a space between pixels adjacent to each other in the row direction. Specifically, the signal line 61 is arranged such that a bent portion 61A is positioned at the intersection $65_C$. The scanning line 62 is arranged so as to pass through the intersection $65_C$ between the space $65_B$ formed along the row direction and the space $65_A$ formed along the column direction at a space between pixels adjacent to each other in the column direction. Specifically, the scanning line 62 is arranged such that a bent portion 62A is positioned at the intersection $65_C$.

As described above with reference to FIG. 13 and FIG. 14, the liquid crystal molecules do not move at all at the portion C in the center between the pixels. Therefore, the center of the intersection $65_C$ between the space $65_A$ formed along the column direction and the space $65_B$ formed along the row direction most negatively affects transmissive display. Passing the signal line 61 and the scanning line 62 not through positions around the respective center of the pixels in the spaces $65_A$ and $65_B$ but through the intersection $65_C$ like in the wiring structure according to the modification can achieve excellent transmissive display compared with the former wiring structure.

4. Electronic Apparatuses

The semi-transmissive liquid crystal display device according to the present disclosure is applicable to a display unit (a display device) of any types of electronic apparatuses that displays a video signal received by the electronic apparatuses or a video signal generated in the electronic apparatuses as an image or video.

The semi-transmissive liquid crystal display device according to the present disclosure is preferably applied to a display unit (a display device) of mobile devices frequently used outdoors among any types of electronic apparatuses. Examples of the mobile devices include, but are not limited to, mobile information devices, such as digital cameras, video cameras, personal digital assistants (PDAs), gaming devices, portable personal computers, and electronic book readers, and mobile communication devices, such as mobile phones.

As is clear from the description of the embodiments, the semi-transmissive liquid crystal display device according to the present disclosure can carry out transmissive display while maintaining reflective display performance equivalent to that of a reflective display device. The semi-transmissive liquid crystal display device can fully enjoy the characteristics of a reflective liquid crystal display device in that less power consumption is required and the screen is easy to read under light environment. Application of the semi-transmissive liquid crystal display device according to the present disclosure to a display unit of any types of electronic apparatuses, specifically, of mobile devices can contribute significantly to low power consumption of the mobile devices.

The following describes electronic apparatuses provided with the semi-transmissive liquid crystal display device 1 or 1a according to the present disclosure as a display unit, that is, specific examples of an electronic apparatus according to the present disclosure.

Figure 26A:
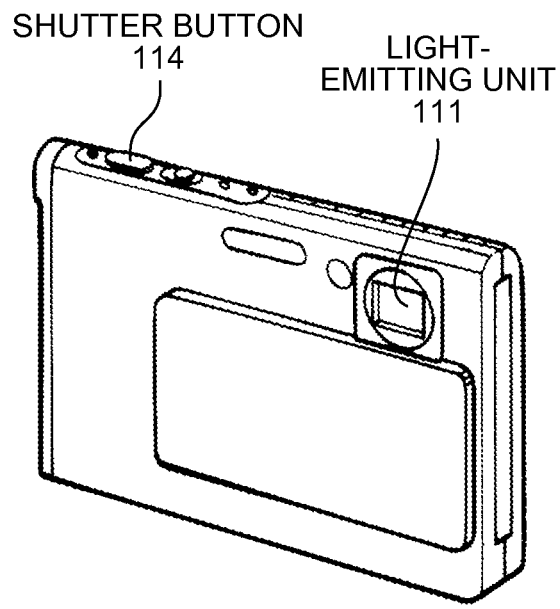
FIG. 26A is a perspective view of an appearance of a digital camera to which the present disclosure can be applied.
Figure 26B:
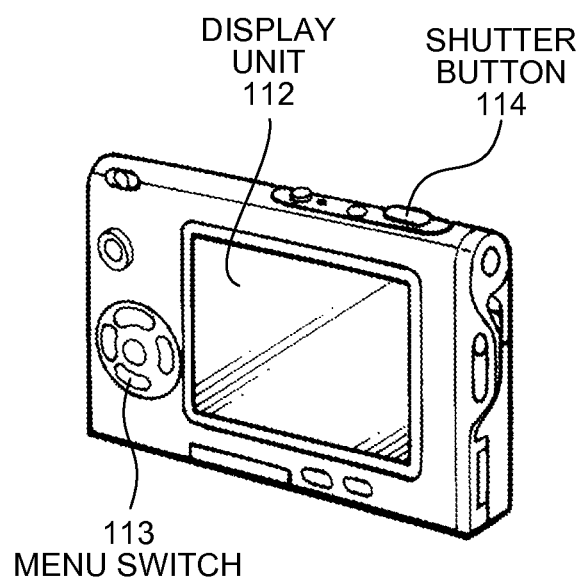
FIG. 26B is another perspective view of the appearance of the digital camera to which the present disclosure can be applied.

FIG. 26A is a perspective view of an appearance of a digital camera viewed from the front, to which the present disclosure is applied. FIG. 26B is a perspective view of an appearance of the digital camera viewed from the back. The digital camera according to the present example includes a light-emitting unit 111 that outputs flashlight, a display unit 112, a menu switch 113, and a shutter button 114. The digital camera is manufactured by applying the semi-transmissive liquid crystal display device 1 or 1a according to the present disclosure to the display unit 112.

Figure 27:
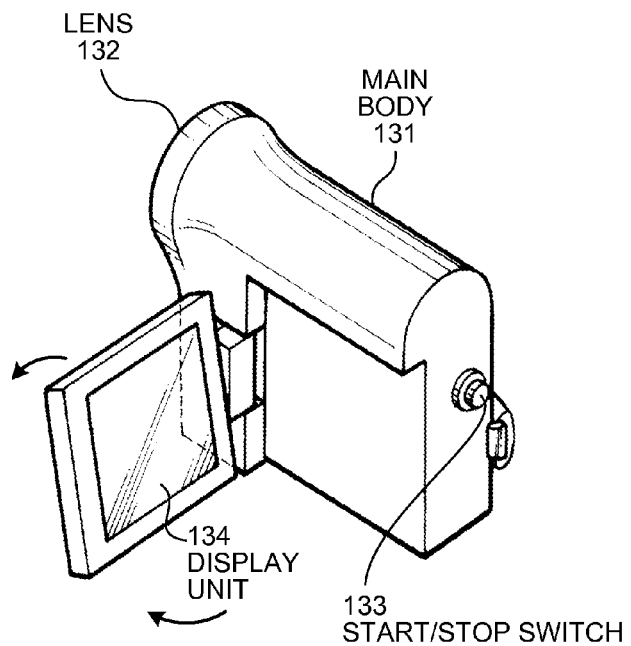
FIG. 27 is a perspective view of an appearance of a video camera to which the present disclosure can be applied.

FIG. 27 is a perspective view of an appearance of a video camera to which the present disclosure is applied. The video camera according to the present example includes a main body 131, a lens 132 arranged on the side facing the front to capture a subject, a start/stop switch 133 used in capturing, and a display unit 134. The video camera is manufactured by applying the semi-transmissive liquid crystal display device 1 or 1a according to the present disclosure to the display unit 134.

Figure 28:
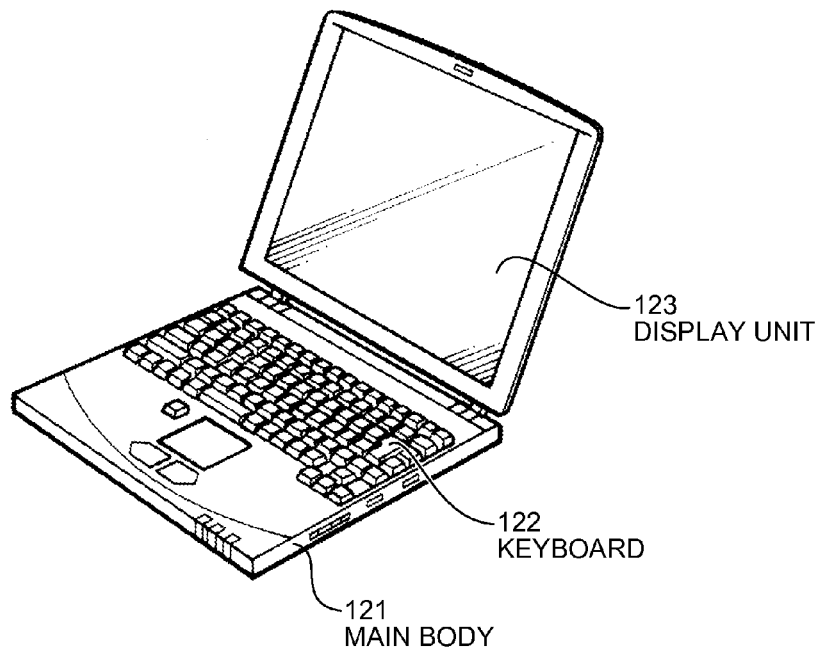
FIG. 28 is a perspective view of an appearance of a portable personal computer to which the present disclosure can be applied.

FIG. 28 is a perspective view of an appearance of a notebook personal computer to which the present disclosure is applied. The notebook personal computer according to the present example includes a main body 121, a keyboard 122 operated when inputting characters and the like, and a display unit 123 that displays an image. The notebook personal computer is manufactured by applying the semi-transmissive liquid crystal display device 1 or 1a according to the present disclosure to the display unit 123.

FIG. 29A to FIG. 29G are views of an appearance of a mobile communication device, such as a mobile phone, to which the present disclosure is applied.

Figure 29A:
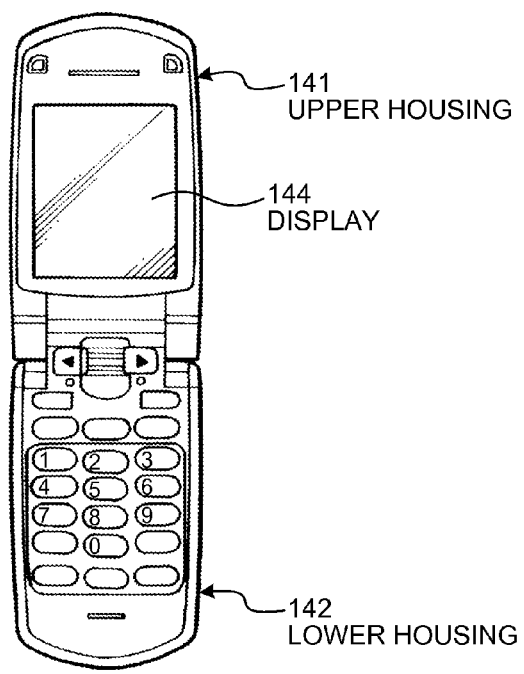
FIG. 29A is a front view of a mobile phone to which the present disclosure can be applied in an unfolded state.
Figure 29B:
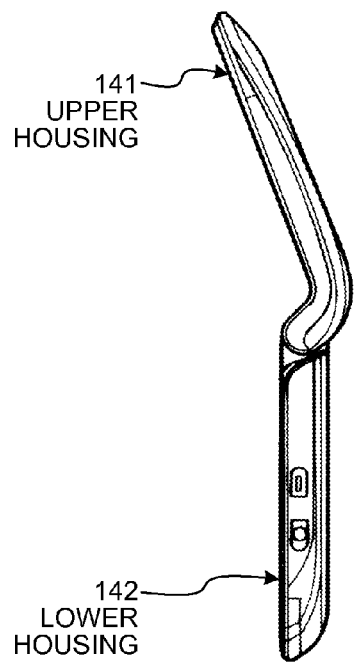
FIG. 29B is a side view of the mobile phone to which the present disclosure can be applied.
Figure 29C:
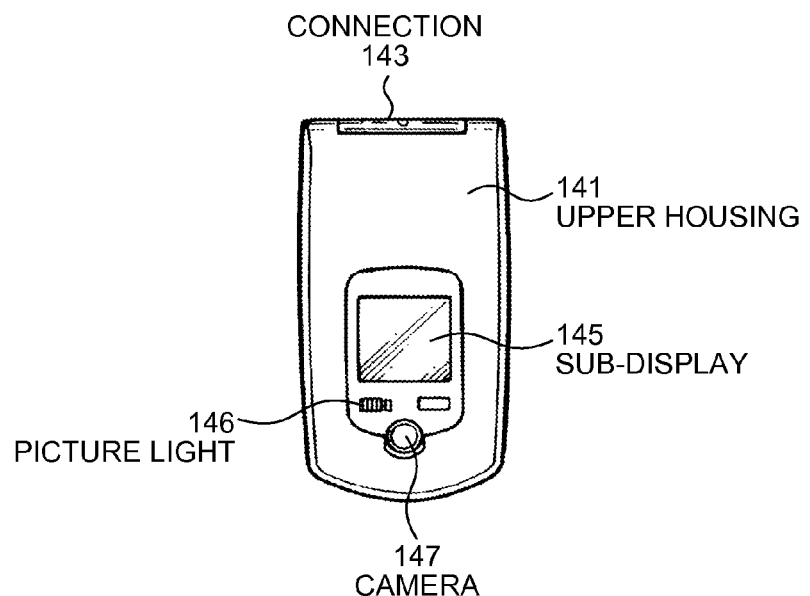
FIG. 29C is a front view of the mobile phone to which the present disclosure is applied can be a folded state.
Figure 29D:
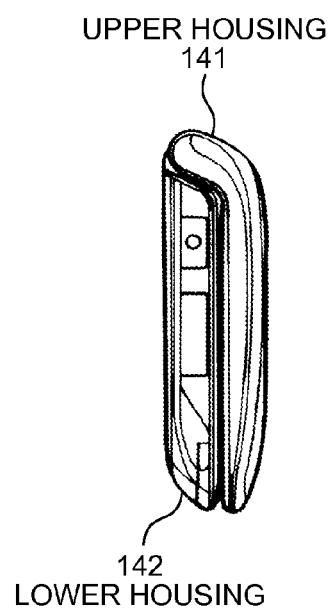
FIG. 29D is a left side view of the mobile phone to which the present disclosure can be applied.
Figure 29E:
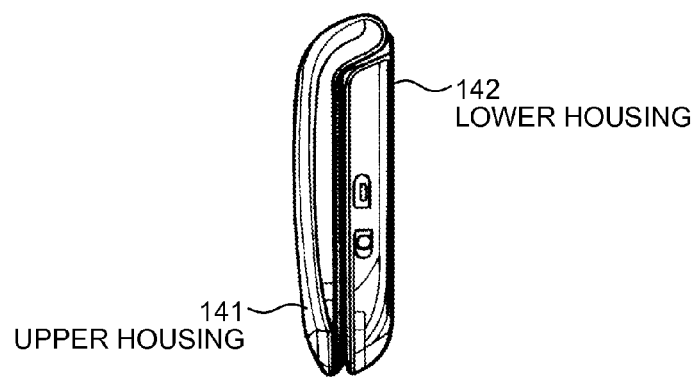
FIG. 29E is a right side view of the mobile phone to which the present disclosure can be applied.
Figure 29F:
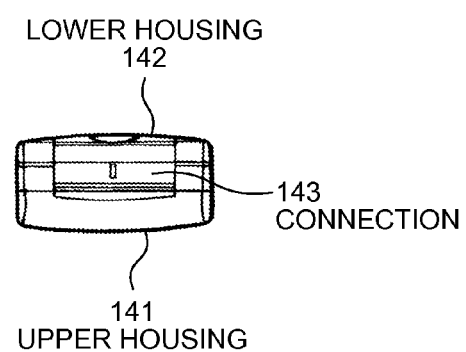
FIG. 29F is a top view of the mobile phone to which the present disclosure can be applied.
Figure 29G:
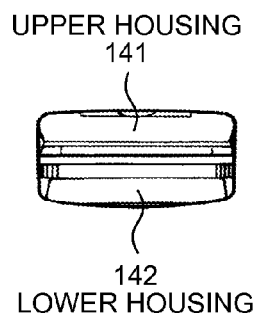
FIG. 29G is a bottom view of the mobile phone to which the present disclosure can be applied.

FIG. 29A is a front view of the mobile phone in an unfolded state, and FIG. 29B is a side view. FIG. 29C is a front view of the mobile phone in a folded state, FIG. 29D is a left side view, FIG. 29E is a right side view, FIG. 29F is a top view, and FIG. 29G is a bottom view.

The mobile phone according to the example includes an upper housing 141, a lower housing 142, a connection (a hinge in this example) 143, a display device 144, a sub-display device 145, a picture light 146, and a camera 147. The mobile phone according to the present example is manufactured by applying the semi-transmissive liquid crystal display device 1 or 1a according to the present disclosure to the display device 144 and the sub-display device 145.

According to one aspect of the present disclosure, transmissive display can be achieved while maintaining reflective display performance equivalent to that of a reflective display device by carrying out the transmissive display with a space between pixels of reflective electrodes.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A semi-transmissive liquid crystal display device comprising:
    a plurality of pixels arranged in a matrix;
    a plurality of reflective electrode groups provided for each of the pixels, each of the reflective electrode groups including one or more reflective electrodes, with a combination of the areas of the reflective electrode groups being used to perform area coverage modulation using n bits, where n is an integer equal to or more than 2, each reflective electrode group corresponding to one of the n bits, the reflective electrode groups being configured such that a ratio of the sum of the perimeters of the reflective electrodes in each reflective electrode group corresponding to each bit of the n bits satisfies $1:2:\ldots:2^{n-1}$,
    a counter electrode facing the plurality of reflective electrode groups; and
    a liquid crystal layer provided between the reflective electrode groups and the counter electrode, wherein
    the semi-transmissive liquid crystal display device is configured to
        carry out reflective display using the reflective electrodes and
        carry out transmissive display using at least a space of the reflective electrodes between the pixels,
    the reflective electrodes include a first reflective electrode, a second reflective electrode, and a third reflective electrode,
    the reflective electrode groups being configured to perform the area coverage modulation by using 2 bits with an area ratio of 2:1 with a combination of the areas of the first and second reflective electrodes with the third reflective electrode, and
    the first and second reflective electrodes are arranged adjacent to each other and electrically connected on a same plane, and first reflective electrode is adjacent to the third electrode.

2. The semi-transmissive liquid crystal display device according to claim 1, wherein
    the reflective electrodes corresponding to a bit higher than the least significant bit are arranged symmetrically with respect to one or more of the reflective electrodes corresponding to the least significant bit.

3. The semi-transmissive liquid crystal display device according to claim 1, further comprising
    a conductor formed of a same material as that of the first and second reflective electrodes, the conductor electrically connecting the two reflective electrodes on the plane, wherein
    the first and second reflective electrodes and the conductor are integrally formed.

4. The semi-transmissive liquid crystal display device according claim 1, wherein
    the reflective electrodes have a same shape and a same size.

5. The semi-transmissive liquid crystal display device according to 1, wherein
    two or more of the reflective electrodes corresponding to the same bit are electrically connected to one another.

6. The semi-transmissive liquid crystal display device according to claim 1, wherein
    the reflective electrodes are arranged such that luminance and gradation change in proportion to each other.

7. The semi-transmissive liquid crystal display device according to claim 6, wherein
    a gap between reflective electrodes adjacent to each other in one of the pixels is larger than a gap between reflective electrodes of two pixels adjacent to each other in a column direction.

8. The semi-transmissive liquid crystal display device according to claim 6, wherein
    a gap between a reflective electrode corresponding to a lower bit and an adjacent reflective electrode thereof in one of the pixels is larger than a gap between a reflective electrode corresponding to a higher bit and an adjacent reflective electrode thereof in the pixel.

9. The semi-transmissive liquid crystal display device according to claim 1, wherein
    parts of color filters included in the pixels adjacent to each other in a row direction overlap with each other.

10. The semi-transmissive liquid crystal display device according to claim 1, further comprising
    a scattering layer for scattering light to a side of a traveling direction of light reflected by the reflective electrode than the liquid crystal layer.

11. The semi-transmissive liquid crystal display device according to claim 1, wherein
    the semi-transmissive liquid crystal display device has a display mode of a normally black mode.

12. The semi-transmissive liquid crystal display device according to claim 1, wherein the pixels have a memory function.

13. The semi-transmissive liquid crystal display device according to claim 12, wherein the pixels comprise a memory that stores therein data.

14. The semi-transmissive liquid crystal display device according to claim 13, wherein the pixels are provided with memory liquid crystal.

15. A semi-transmissive liquid crystal display device comprising:
    a plurality of pixels arranged in a matrix;
    a plurality of reflective electrode groups provided for each of the pixels, each of the reflective electrode groups including one or more reflective electrodes, with a combination of the areas of the reflective electrode groups being used to perform area coverage modulation using n bits, where n is an integer equal to or more than 2, each reflective electrode group corresponding to one of the n bits, reflective electrode groups being configured such that a ratio of the sum of the perimeters of the reflective electrodes in each reflective electrode group corresponding to each bit of the n bits satisfies $1:2:\ldots:2^{n-1}$ in an opening of the pixel;

a counter electrode facing the plurality of reflective electrode groups; and a liquid crystal layer provided between the reflective electrode groups and the counter electrode, wherein the semi-transmissive liquid crystal display device is configured to carry out reflective display using the reflective electrodes and carry out transmissive display using at least a space of the reflective electrodes between the pixels, the reflective electrodes include a first reflective electrode, a second reflective electrode, and a third reflective electrode, the reflective electrode groups being configured to perform the area coverage modulation by using 2 bits with an area ratio of 2:1 with a combination of the areas of the first and second reflective electrodes with the third reflective electrode, and the first and second reflective electrodes are arranged adjacent to each other and electrically connected on a same plane, and first reflective electrode is adjacent to the third electrode.

* * * * *